United States Patent
Shinohara et al.

(10) Patent No.: US 6,843,811 B2
(45) Date of Patent: Jan. 18, 2005

(54) METHOD OF MANUFACTURING SEALED BATTERY AND SEALED BATTERY

(75) Inventors: Wataru Shinohara, Moriguchi (JP); Yasuaki Yamamoto, Moriguchi (JP); Hiroshi Hosokawa, Moriguchi (JP); Yasuhiro Yamauchi, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 106 days.

(21) Appl. No.: 10/254,967

(22) Filed: Sep. 24, 2002

(65) Prior Publication Data

US 2003/0059677 A1 Mar. 27, 2003

Related U.S. Application Data

(63) Continuation of application No. 09/530,550, filed as application No. PCT/JP98/04990 on Nov. 6, 1998, now Pat. No. 6,573,001.

(30) Foreign Application Priority Data

| Nov. 7, 1997 | (JP) | 9-306183 |
| Sep. 30, 1998 | (JP) | 10-279094 |
| Sep. 30, 1998 | (JP) | 10-279095 |

(51) Int. Cl.$^7$ ............................................... H01M 6/00
(52) U.S. Cl. ........................ 29/623.2; 29/623.1; 29/428
(58) Field of Search ............................ 29/623.1, 623.2, 29/592.1, 421.1, 422, 623.4, 428; 429/163, 175, 176, 185, 174

(56) References Cited

U.S. PATENT DOCUMENTS

| 5,811,206 A | * | 9/1998 | Sunderland et al. ........ 429/181 |
| 6,132,900 A | | 10/2000 | Yoshizawa et al. |

FOREIGN PATENT DOCUMENTS

| JP | 52-103353 | 8/1977 |
| JP | 1-115052 | 5/1989 |
| JP | 7-251284 | 10/1995 |
| JP | 8-077983 | 3/1996 |
| JP | 61-3664 | 1/2000 |
| JP | 60-33890 | 1/2000 |

* cited by examiner

Primary Examiner—Raymond Alejandro
(74) Attorney, Agent, or Firm—Merchant & Gould P.C.

(57) ABSTRACT

A method of manufacturing a sealed battery that is able to keep productivity as high as possible while suppressing cracking incident to welding using an energy beam, such as a laser beam. A material such as an aluminum alloy is used for the external casing and the cover plate. The cover plate bas a rib, which is formed on the outer edge of the cover plate, and a flat part. The external casing rim and the outer edge of the cover plate are welded together, the thickness of the external casing at the rim is made small. A closure cap is fit into the external casing. The closure cap and external casing are welded together and the molten part is gradually cooled.

6 Claims, 23 Drawing Sheets

(a)

(b)

METHOD OF MANUFACTURING SEALED BATTERY AND SEALED BATTERY

This application is a continuation of application Ser. No. 09/530,550, filed on Jul. 18, 2000, now U.S. Pat. No. 6,573,001, which is a 371 of PCT/JP98/04990, filed on Nov. 6, 1998, which application(s) are incorporated herein by reference.

FIELD OF THE INVENTION

The present invention relates to a method of manufacturing a sealed battery using a laser beam and a sealed battery.

BACKGROUND OF THE INVENTION

With a growing demand for portable electric appliances such as mobile phone, portable audiovisual device, and portable computers, demand for high-performance batteries has grown. Especially, demand for secondary battery such as nickel-cadmium battery, nickel-metal hydride battery, and lithium-ion secondary battery has increased.

Generally, those batteries are sealed ones and have the shape of cylinder or rectangular cylinder. Among them, rectangular-cylinder sealed batteries draw attention due to a space-saving advantage. Accordingly, it is assumed that there is a great demand for higher performance and reliability of rectangular-cylinder sealed batteries.

A rectangular-cylinder sealed battery is generally manufactured as follows. A bottomed, rectangular-cylinder external casing is formed by drawing a metal plate. In the external casing, a generator element composed of positive and negative electrodes are enclosed. The opening of the external casing is covered with a cover plate. When covering the opening with the cover plate, the cover plate is sealed by caulking or melting in general.

The sealing prevents electrolyte and gas from leaking out of the external casing when pressure increases inside of the external casing. The sealing quality profoundly affects the reliability and life of a battery.

Generally, mechanical caulking is often used for sealing process of battery. For rectangular-cylinder sealed batteries, however, it is difficult to adopt caulking in many cases, so that laser welding is also often used.

FIG. 25 is a conceptual diagram showing a conventional sealing technology using laser welding that has been generally adopted for sealed batteries.

FIG. 25 shows that a cover plate and an outer casing are welded together using a laser as follows. A flat cover plate 410 is fit into the opening of an external casing 400 so that the upper surface of the cover plate 410 has the same level as the top end of the rim of the external casing 400. A laser beam is intermittently aimed at the boundary between the outer edge of the cover plate 410 and the rim of the external casing 400 at a certain speed. The sealing technology using laser welding can realize the complete sealing of rectangular-cylinder sealed batteries, leading to higher reliability and longer life of rectangular-cylinder sealed batteries. As a result, the laser sealing is regarded as one core technology for higher quality of rectangular-cylinder sealed batteries.

Conventionally, the external casing and the cover plate are made of a nickel-plated steel plate or a stainless steel plate. Recently, however, an aluminum alloy plate, which is made by doping aluminum with manganese and the like, has been also used in many cases for weight reduction.

It is troublesome to use an aluminum alloy plate, however. When the external casing and the cover plate are welded using a laser, the welded part is susceptible to cracking.

Generally, cracking arises in the scanning direction of a laser beam. It is assumed that a part which has been welded using a laser beam, i.e., a welded part is pulled by heat stress that has been generated around the welded part in the course of cooling. The welded part is susceptible to cracking in the case of an aluminum alloy plate since the welded part is rapidly cooled due to the lower tensile strength and higher heat conductivity than iron and stainless.

One proposed solution to this problem is to lower the scanning speed of the laser beam since a lower scanning speed reduces the incidence of cracking. In order to curb the incidence of cracking as low as possible, the scanning speed of the laser beam is now set as relatively low for the laser welding. In terms of production efficiency, however, it is not desirable to lower the laser beam scanning speed since it takes longer time for the sealing.

DISCLOSURE OF THE INVENTION

Accordingly, the present invention is made about the sealed battery including the rectangular sealed battery and takes into account these problems that have been described. The object of the present invention is to provide a manufacturing method of sealed battery that is able to keep productivity as high as possible while suppressing cracking incident to welding using an energy beam such as a laser beam when a material such as an aluminum alloy is used for the external casing and the cover plate and to provide the sealed battery.

First of all, inventive design of the closure cap and the external casing reduce the heat stress at the welded part, so that cracking is suppressed. The result depends on the sizes of the closure cap and the external casing. When the closure cap and the external casing are designed so as to satisfy the equations (Equations 3 to 5, which are described later) obtained by numerical value analysis, the heat stress is more significantly reduced.

Then, inventive distribution of the energy of the laser that is used for welding reduces the heat stress at the welded part, so that cracking is suppressed.

In addition, gradual cooling of the molten part during welding reduces the molten part cooling speed and the heat stress at the welded part, so that cracking is suppressed.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 16(a) shows the energy distribution of the laser used in the present invention;

FIG. 16(b) shows a sectional view of a molten pool in the present invention;

FIG. 16(c) shows the energy distribution of a conventional laser;

FIG. 16(d) shows a sectional view of a molten pool that has been radiated with the conventional laser;

FIG. 17(a) is a schematic view of a welded mark;

FIG. 17(b) is a vertical sectional view of the central part of the welded mark in FIG. 17(a);

DESCRIPTION OF THE PREFERRED EMBODIMENTS

A specific explanation of a rectangular-cylinder sealed battery according to the present invention will be given below in accordance with figures.

[The First Embodiment]

Figure 1:
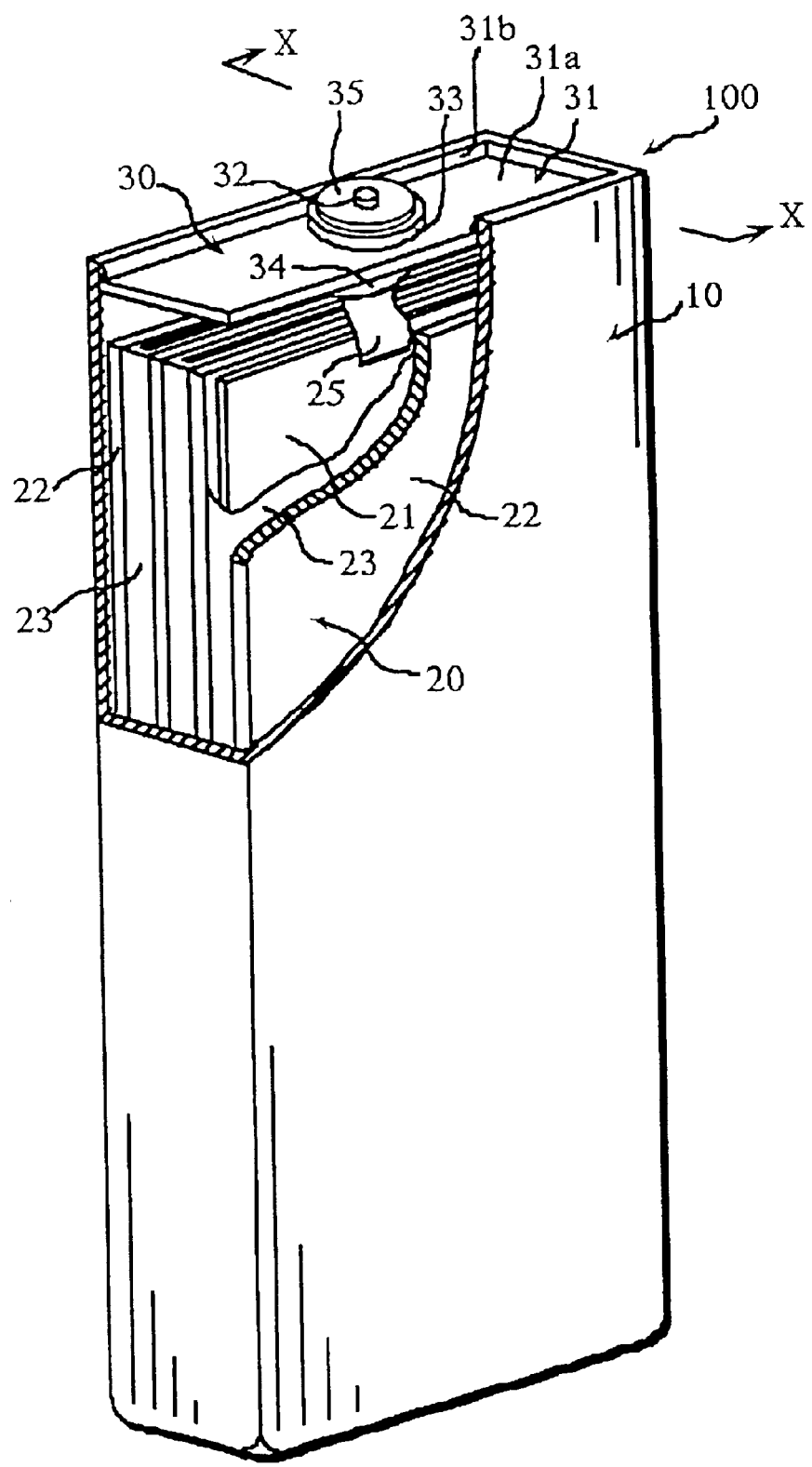
FIG. 1 is a perspective view, partly broken away to show the interior construction, of a sealed battery according to the first embodiment.
Figure 2:
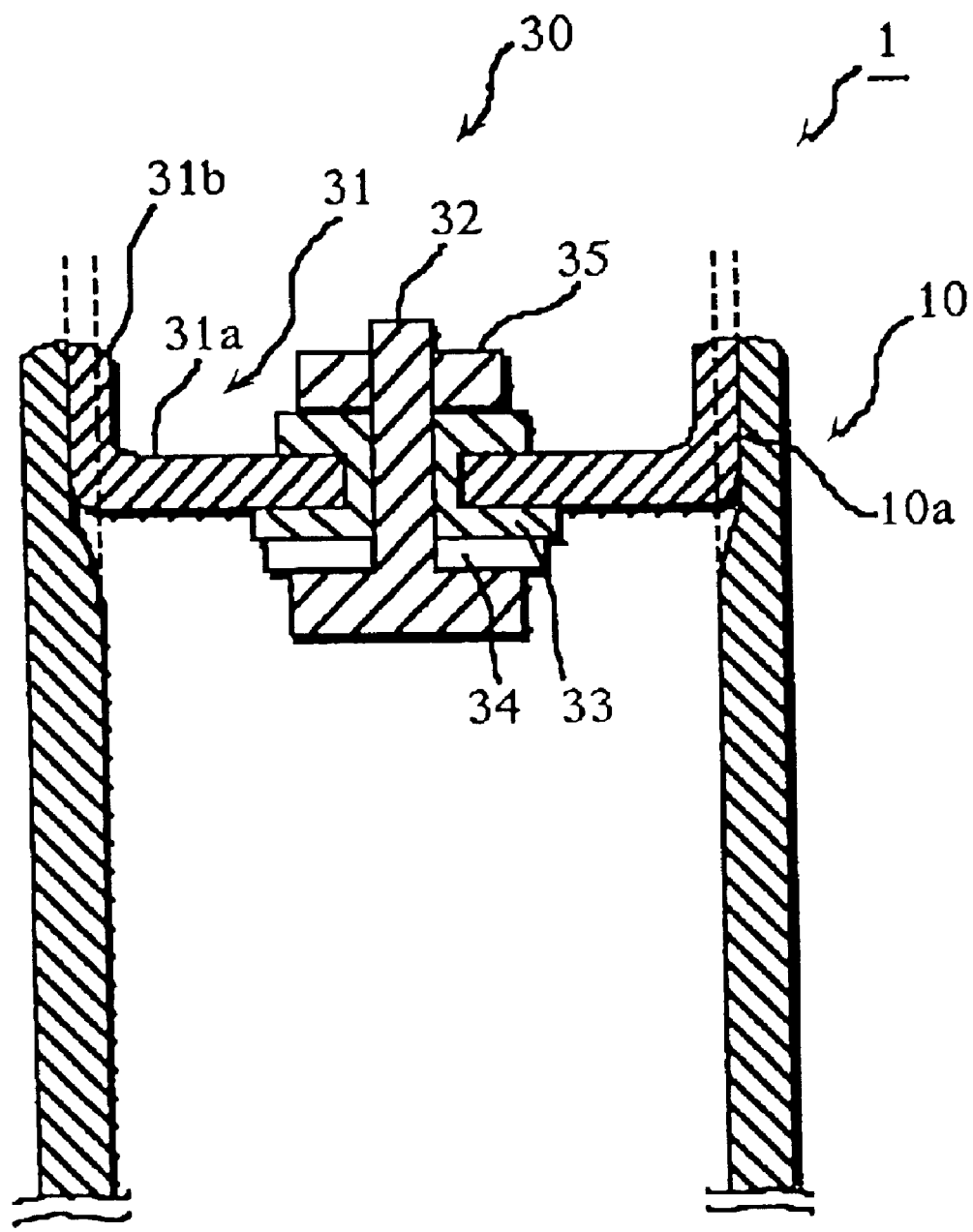
FIG. 2 is an enlarged sectional view of the main structure of the sealed battery in FIG. 1.

FIG. 1 is a perspective view of a rectangular cylinder sealed battery 1 (referred to a "battery 1" hereinafter) according to the first embodiment. FIG. 2 is an enlarged sectional view taken on line X—X of FIG. 1 of the main structure of the sealed battery in FIG. 1.

The battery 1 is a lithium-ion secondary battery and has a structure as follows. Into an external casing 10, which is a bottomed rectangular cylinder, an electrode group 20, which is formed by sandwiching a separator between a positive and negative electrodes, and nonaqueous electrolyte are inserted. The opening of the external casing 10 is sealed with a closure cap 30.

The external casing 10 is a bottomed rectangular cylinder made from an Al—Mn alloy plate.

Including aluminum (Al) as its major constituent, Al—Mn alloy is light in weight. At the same time, doped with manganese, Al—Mn alloy possesses high tensile strength. Note that too high content of manganese lowers the suitability of Al—Mn alloy to be worked and welded at the time of forming external casings. As a result, appropriate content of manganese is 1.0 to 1.5 wt %.

As shown in FIGS. 1 and 2, the closure cap 30 is formed by attaching a negative electrode terminal 32, which is nail-shaped, to the cover plate 31 via an insulating packing 33 so as to go through the cover plate 31 at the center, which has been formed so as to be fit into the opening of the external casing 10.

The cover plate 31 is a rectangular plate made by punching out an Al—Mn alloy plate, which is the same kind of Al—Mn alloy plate used for the outer casing 10.

The thickness of the outer casing 10 and the cover plate 31 is set as thin as possible so as to keep required strength. Generally, the thickness is set at about 500 $\mu$m.

To the bottom of the negative electrode terminal 32 (inside of the battery), an electrode collector plate 34 is attached and to the top (outside of the battery), a washer 35. The electrode terminal 32, the electrode collector plate 34, and the washer 35 are crimped onto the cover plate 31 by caulking so as to be insulated from the cover plate 31 by the insulating packing 33.

The negative electrode 21 is formed by applying carbon with a layer structure (graphite powders) onto a plate and is covered by a separator 23. The plate of the negative electrode 21 is connected to the electrode collector plate 34 by a lead plate 25.

On the other hand, the positive electrode 22 in the electrode group 20 is formed by applying positive active material of oxide containing lithium (for instance, lithium cobaltate) and conductive material (for instance, acetylene black) onto a plate (not illustrated in detail). The positive electrode 22 directly comes into contact with and is electrically connected to the external casing 10, which is also the positive pole.

The nonaqueous electrolyte is made by dissolving $LiPF_6$ as the solute in the mixed solvent of ethylene carbonate and dimethyl carbonate.

The external casing 10 is sealed by welding a rim 10a of the external casing 10 and the outer edge of the cover plate 31 together using laser.

Figure 5:
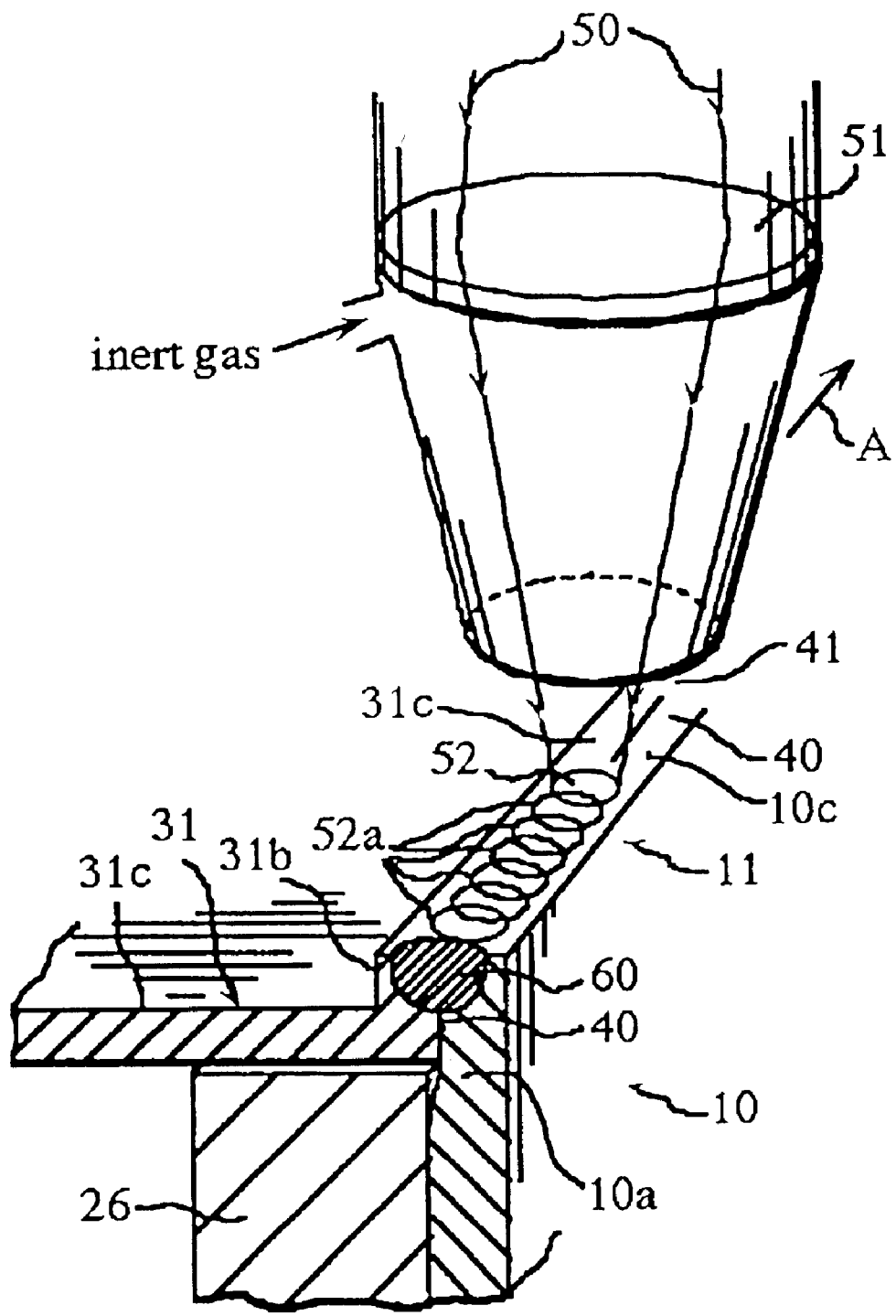
FIG. 5 is a perspective view showing how the external casing is sealed with laser welding.

Not illustrated in FIG. 1, an insulating sleeve 26 made of an insulating resin is disposed between the electrode group 20 and the cover plate 31 (refer to FIG. 5). By doing so, the electrode group 20 is fixed in a home position inside of the external casing 10 and is prevented from coming into contact with the closure cap 30.

The following is an explanation of the method of manufacturing the battery 1.

Figure 3:
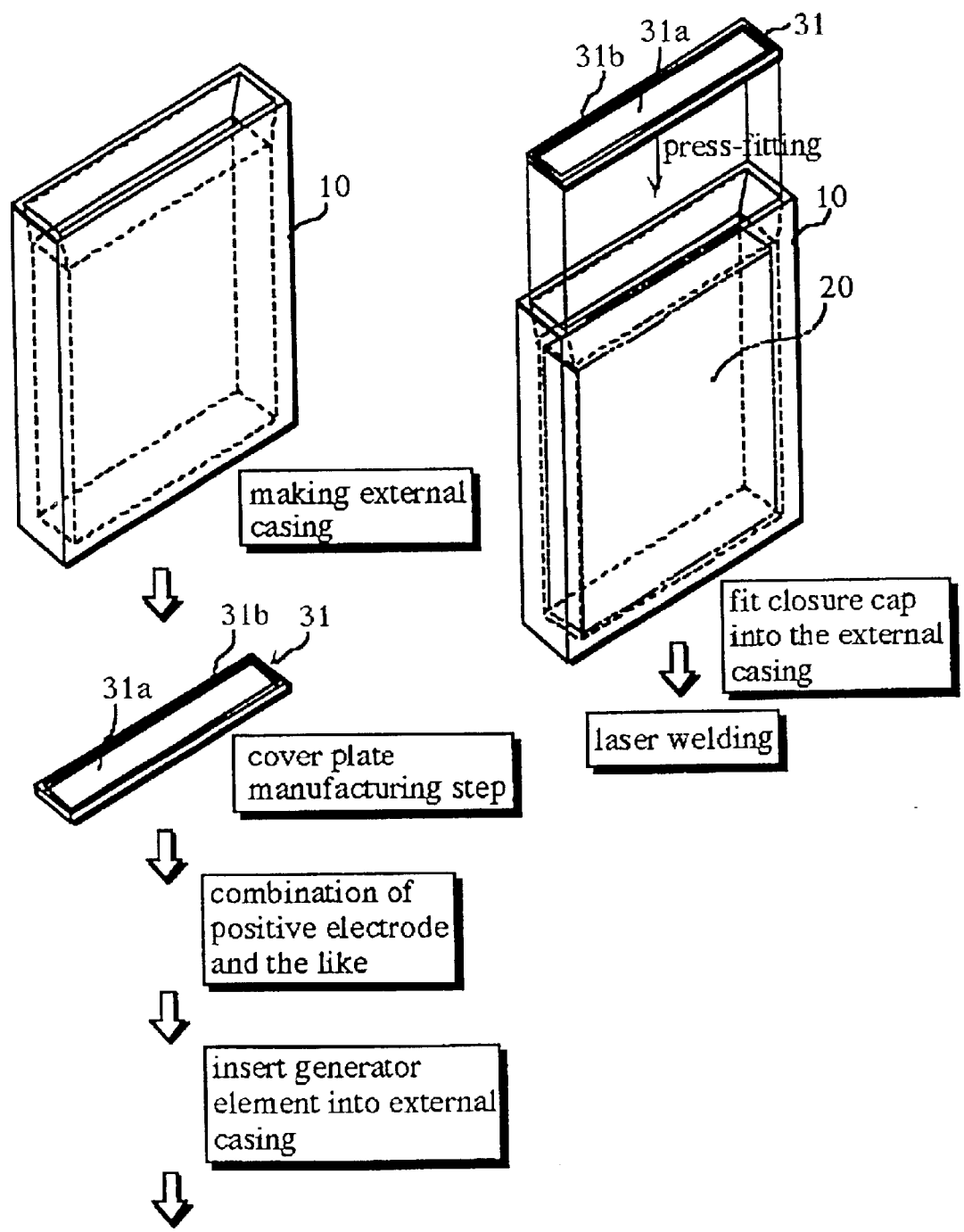
FIG. 3 shows the manufacturing process of the sealed battery in FIG. 1.

FIG. 3 is a diagrammic sketch of the manufacturing process of the battery 1.

First, the bottomed external casing 10 is made by drawing an aluminum alloy plate using a punch and a die.

Figure 4:
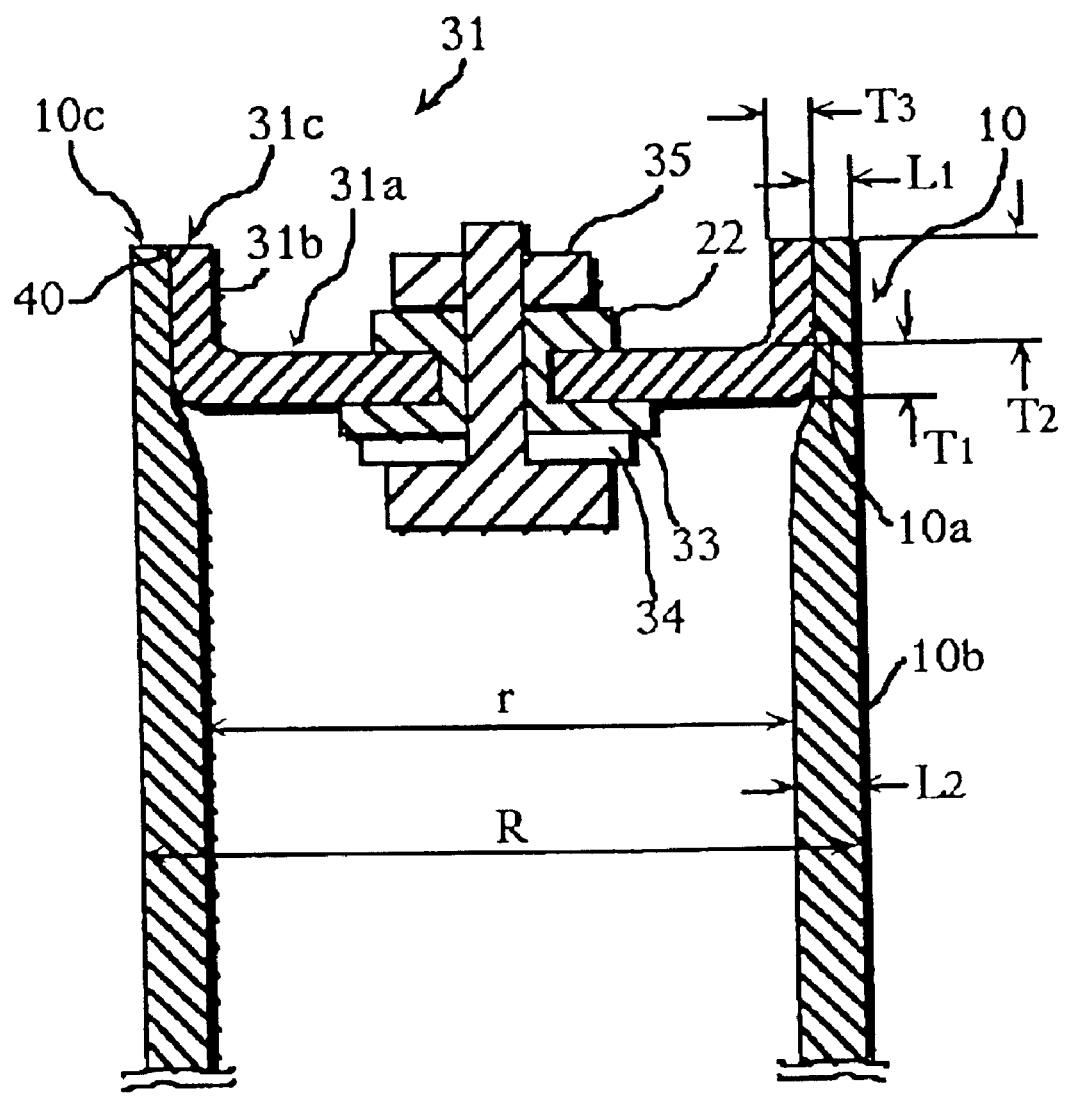
FIG. 4 is an enlarged sectional view of the main structure of the sealed battery in FIG. 1 when the cover plate is fit into the opening of the external casing.

FIG. 4 shows how the cover plate 31 is fit into the opening of the external casing 10 before the outer edge of the cover plate 31 and the rim 10a are welded together.

The thickness L1 ($\mu$m) of the rim 10a of the external casing 10 is adjusted so as to be smaller than the thickness L2 ($\mu$m) of the main body 10b of the external casing 10. More specifically, as shown in FIG. 4, the thickness L1 of the external casing 10 at the rim 10a is set smaller than the thickness L2 of the main body 10b so that the external diameter R at the rim 10a is the same as that at the main body 10b and the internal diameter r at the rim 10a is greater than that at the main body 10b. The thickness difference can be easily adjusted by making the part of the punch corresponding to the rim 10a greater.

Then, the cover plate 31 on which a rib 31b is formed along the outer edge is made by drawing an aluminum alloy plate so as to be fit into the opening of the external casing 10.

Here, the thickness T3 ($\mu$m) of the rib 31b is adjusted so as to be smaller than the thickness T1 ($\mu$m) of the flat part 31a. The thicknesses T1 of the flat part 31a and the thickness T3 of the rib 31b can be easily adjusted by adjusting the size of the part of the punch corresponding to the rib 31b as in the case of the adjustment of the thicknesses L1 and L2. Here, the distance between the top end of the rib 31b and the upper surface of the flat part 31a is defined as the height T2 ($\mu$m) of the rib 31b.

Next, the closure cap 30 is made by attaching the negative terminal and the like at the center of the cover plate 31.

Then, the electrode group 20 composed of the positive and negative electrodes and the separator is inserted into the external closing 10. The negative electrode 21 is electrically connected to the electrode collector plate 34 using a lead plate 25. Next, the electrolyte is poured into the external casing 10, and the closure cap 30 is press-fit into the external casing 10 so that the top end 10c of the external casing 10 and the rib top end 31c of the closure cap 30 have almost the same levels.

Then, a laser beam is intermittently aimed at the part (boundary) 40 between the external casing 10 and the closure cap 30, i.e., the boundary between the top end 10c of the external casing 10 and the rib top end 31c to perform laser welding.

A more detailed explanation of the laser welding will be given below. FIG. 5 is a perspective view showing how the external casing 10 is sealed with laser welding.

In a device shown in FIG. 5, a condenser lens 51 can drive the optical axis in any direction in a plane parallel with the cover plate 31. A laser is guided to the condenser lens 51 from a laser oscillator (not illustrated) via an optical fiber.

The laser oscillator is a device that has yttrium-aluminum-garnet (YAG) emit light and outputs a pulsed laser 50 (for instance, laser pulse repetition rate: 50 pps). The laser 50 converges on the boundary 40 between the cover plate 31 and the rim 10a of the external casing 10 by passing through the condenser lens 51 to form a small round spot 52 (the spot diameter: few hundred $\mu$m).

By doing so, the part corresponding to the spot 52 is locally molten without inflicting any heat damage on the elements (for instance, the insulating sleeve 26) surrounding the molten part.

In the parts corresponding to the spot 52 on which the laser has been radiated, the outer edge (the rib 31b) of the cover plate 31 and the rim 10a of the external casing 10 are molten to form a molten pool. The molten pool solidifies in a short period of time. In FIG. 5, the reference number 60 indicates a welded part where a molten pool has solidified.

Note that a jet of inert gas (nitrogen gas) is emitted to the part surrounding the spot 52 of the laser 50 to prevent the welded part from oxidizing.

The laser pulse repetition rate of the oscillator and the scan rate of the condenser lens 51 are adjusted so that the spot 52 of the laser 50 and an immediately preceding spot, a spot 52a have a moderate overlap (generally, 40 to 60% overlap ratio).

As has been described, the laser 50 is converged on and projected onto the boundary 40 by the condenser lens 51 and the boundary 40 is scanned by moving the condenser lens 51 along the boundary 40 (in the direction of an arrow "A" in FIG. 5) to consecutively form welded parts 60. When the welding of the outer edge of the cover plate 31 and the rim 10a along the boundary 40 is completed, the sealing is finished.

Unlike in the conventional method, in which the outer edge of the flat cover plate is fixed to the rim of the external casing by welding, the cover plate 31 with rib 31b is welded in the manufacturing method of the battery 1. As a result, the battery 1 has the rib 31b on the outer edge of the cover plate 31 as shown in FIG. 2 in the finished form. Some batteries, however, have no rib in the finished form due to the laser beam energy or the height of the rib.

While a more detailed explanation will be given later, the top end of the rib is welded by a laser beam according to the manufacturing method of sealed battery, so that it is assumed that smaller amount of heat energy is transmitted from a molten pool toward the center of the closure cap and a molten pools is difficult to be cooled compared with the case in which a conventional flat cover plate is used.

Meanwhile, the thickness T3 is set smaller compared with the thickness of the cover plate, so that the area to which the heat energy of a molten pool is to be transmitted is much more small. As a result, it is assumed that a molten pool is more difficult to be cooled.

In addition, the thickness L1 of the external casing 10 at the rim 10a is set smaller than the thickness L2 of the main body 10b, so that it is much more difficult to transmit the heat energy of the laser beam from a molten pool.

As has been described, it is difficult to transmit heat energy from a molten pool, so that it is assumed that the heat energy given by the laser beam is accumulated in a molten pool and the temperature of a molten pool decreases extremely slow compared with the case of the conventional sealing method. As a result, the heat stress during the sealing process can be reduced. This leads to less incidence of cracking in the molten pools, so that productivity is expected to be improved.

[Effectiveness of the Shapes of the External Casing 10 and the Closure Cap 30 before Welding]

Here, the effectiveness of the shapes of the external casing 10 and the closure cap 30 before welding will be examined in detail.

In order to study the relationship between the heat stress at laser welding and the size of the rib 31b before welding and between the heat stress and the thickness of the external casing 10 before welding, the inventors carried out the experiment by simulation as follows, considering the laser welding is a heat processing method by absorbing laser beam.

Figure 6:
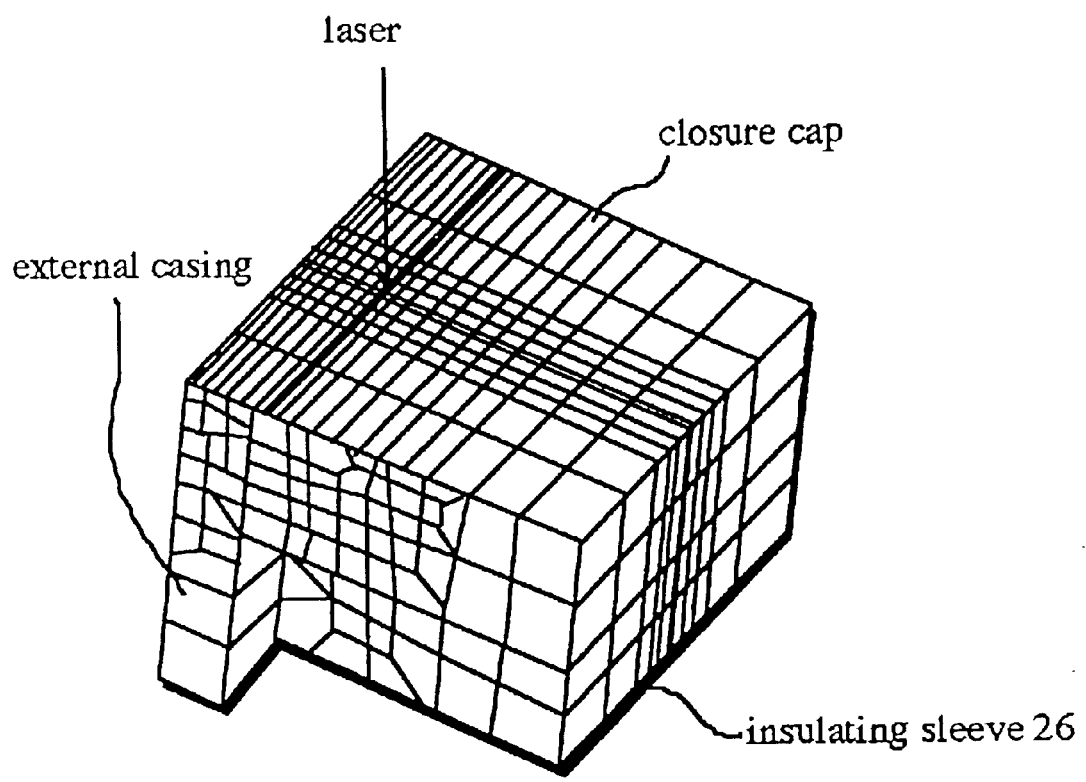
FIG. 6 is a conceptual diagram showing a model, in which one piece of the shielded part (welded part) with laser welding is divided in a mesh form, for the analysis of heat stress.

An analytical model as shown in FIG. 6 that is a piece of shielded part (welded part) with laser welding and is divided in a mesh form is used. As a result of analysis using this analytical model, according to the finite-element method (reference; Japan Society of Mechanical Engineers, "Computer Analysis of Heat and Flow (Netsu to Nagare no Komputa Anarisisu)" (Corona Publishing Co., Ltd., 1986), and in accordance with Equation 1 (a three-dimensional nonlinear non-stationary heat conduction equation) and Equation 2 that are given below, the heat stress arising from the temperature distribution at the laser shielded part is calculated. In order to improve the analysis precision, the mesh is especially fine around the laser beam spots, where the temperature gradient is steep, as shown in FIG. 6.
[Equation 1]
[Equation 2]

Main analytical conditions are as follows. The laser is a YAG laser. The wavelength is 1.06 $\mu$m. The laser power is 9.3×10W. The beam diameter is 450 $\mu$m. The pulse width is 12.0 ms. The analytical time is set at 15.0 ms, considering the period of time required from laser beam radiation via temperature increase, melting, solidification, to returning to a low temperature.

Figure 7:
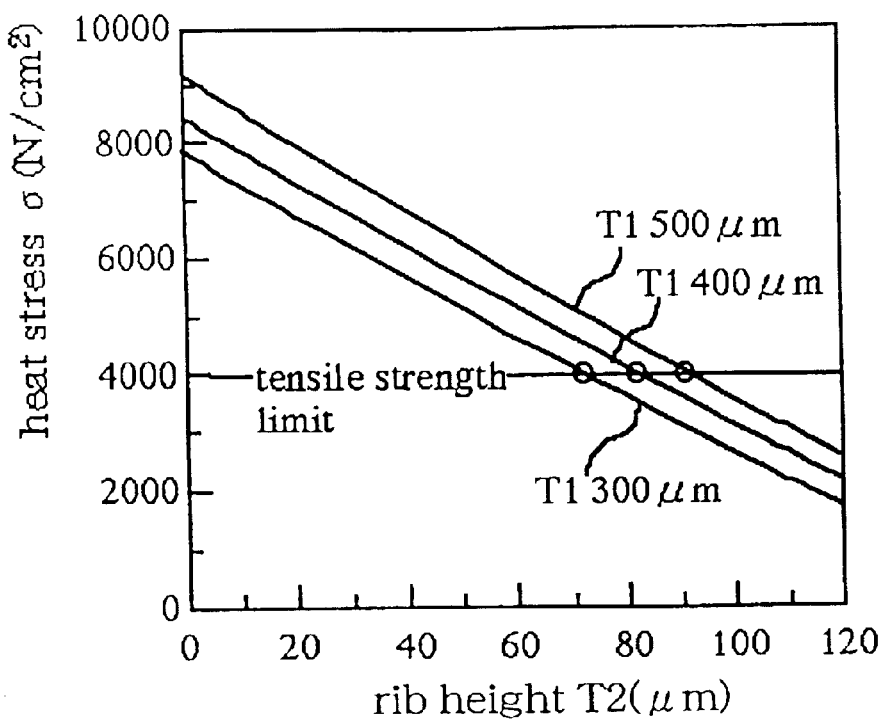
FIG. 7 is a plot showing the relationship between the height of the rib of the cover plate and the heat stress.

FIG. 7 shows the result calculated by the analysis. FIG. 7 is a plot showing the relationship between the height T2 of the rib 31b and the heat stress at the center of the laser spot (N/cm$^2$). Here, being greatest at the center of the laser spot, the heat stress at the center of the laser spot is calculated.

The sizes excluding the numerical value that changes (the height T2), i.e., the thicknesses T3, L1, and L2, are set at 500 $\mu$m. Under this condition, the heat stress is likely to be great.

As shown in FIG. 7, the higher the height T2 of the rib 31b, the less the heat stress, and the smaller the thickness T1 of the flat part 31a, the less the heat stress.

When the heat stress at a molten pool exceeds the limit of the tensile strength of the external casing and the closure cap (the tensile strength limit of the material used here is 4×10$^3$N/cm$^2$), cracking arises. As a result, it is necessary to design the closure cap so that the heat stress of a molten pool is no greater than the tensile strength. FIG. 7 shows that it is desirable to determine the thickness T1 of the flat part 31a and the height T2 of the rib 31b so as to satisfy Equation 3 given below.

$$T_2 \geq T_1/10 + 40 \qquad \text{[Equation 3]}$$

Figure 8:
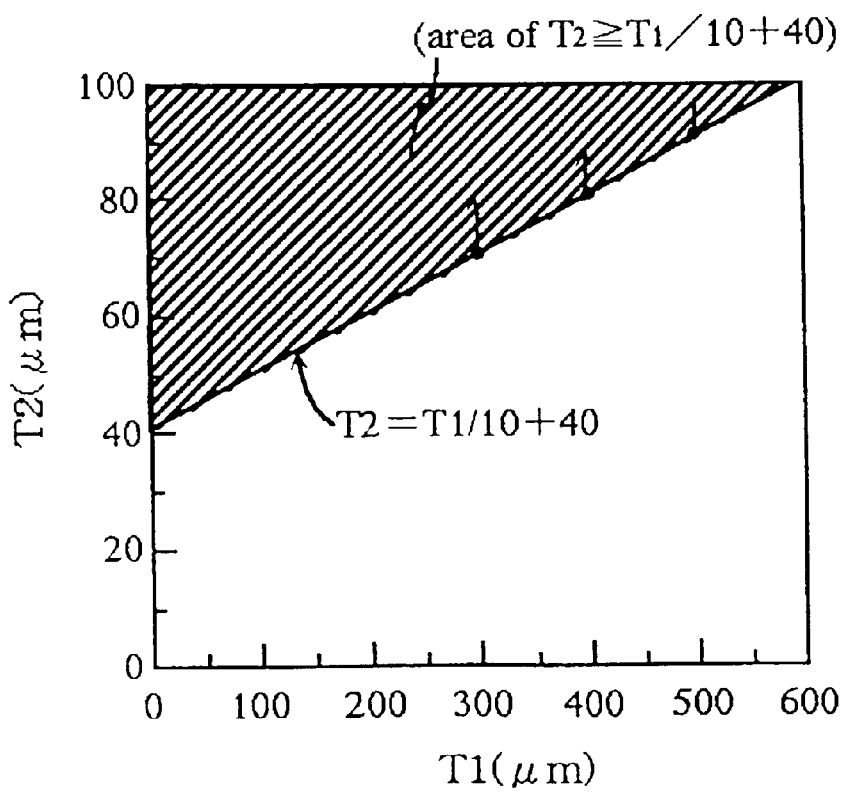
FIG. 8 is a plot showing the relationship between the thickness of the flat part of the cover plate and the height of the rib of the cover plate.

Equation 3 is illustrated by FIG. 8.

The plot in FIG. 8 shows that in order to keep the heat stress less than the tensile strength limit, i.e., in order to satisfy Equation 3, it is necessary to design the battery 1 so as to satisfy the conditions within the diagonally shaped area in FIG. 8.

Figure 9:
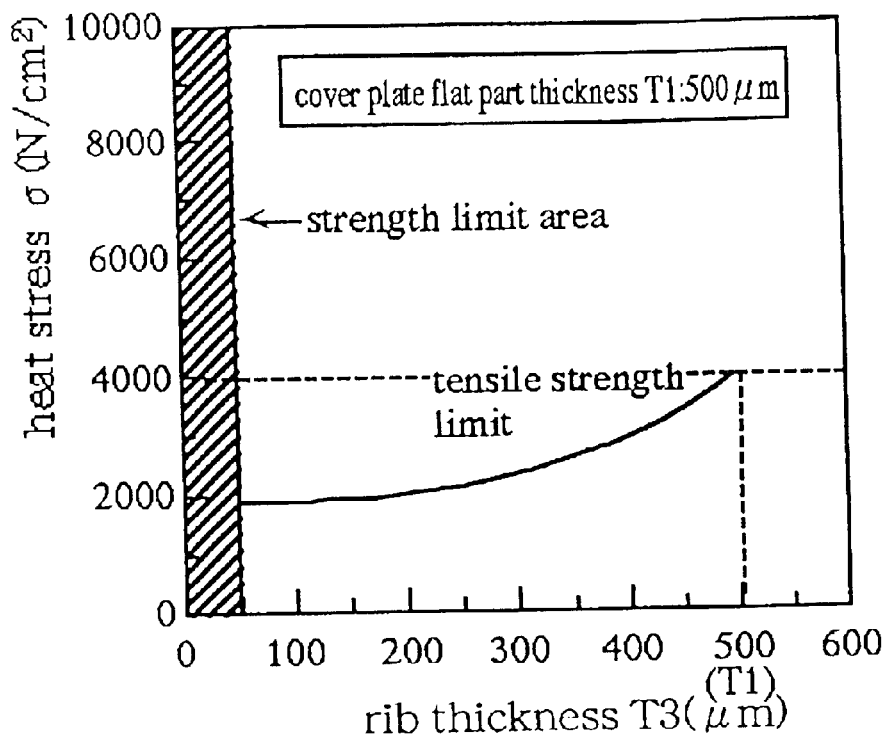
FIG. 9 is a plot showing the relationship between the thickness of the rib of the cover plate and the heat stress.

Then, the relationship between the thickness T3 of the rib 31b and the heat stress at the center of the laser spot is calculated when the height T2 of the rib 31b is the same, the heat stress is great, and the thickness T1 is 5001 $\mu$m according to the analysis result. Here, the height T2 is set at 90 $\mu$m, the thicknesses L1 and L2 are set at 500 $\mu$m. FIG. 9 is a plot showing the result of the calculation.

As shown in FIG. 9, when the thickness T3 of the rib 31b is the same as the thickness T1 of the flat part 31a, the heat stress at a molten pool is almost the same as the tensile strength limit (here, 4×10$^3$N/cm$^2$). On the other hand, when the thickness T1 of the flat part 31a is fixed and the thickness T3 of the rib 31b of the cover plate 31 is set as smaller, the heat stress becomes less. This shows that it is effective to set the thickness T3 of the rib 31b as no greater than the thickness T1 of the flat part 31a in order to have the heat stress at a molten pool be less than the tensile strength limit and to prevent cracking.

As a result, considering the circumstances under which the thickness T3 of the rib 31b, which is decided according to the mechanical strength of the aluminum alloy plate, should be set as at least 50 $\mu$m, it is preferable to set the thicknesses T3 of the rib 31b and the thickness T1 of the flat part 31a so as to satisfy Equation 4 given below.

$$50[\mu m] \geq T_3 \geq T_1 \qquad \text{[Equation 4]}$$

Figure 10:
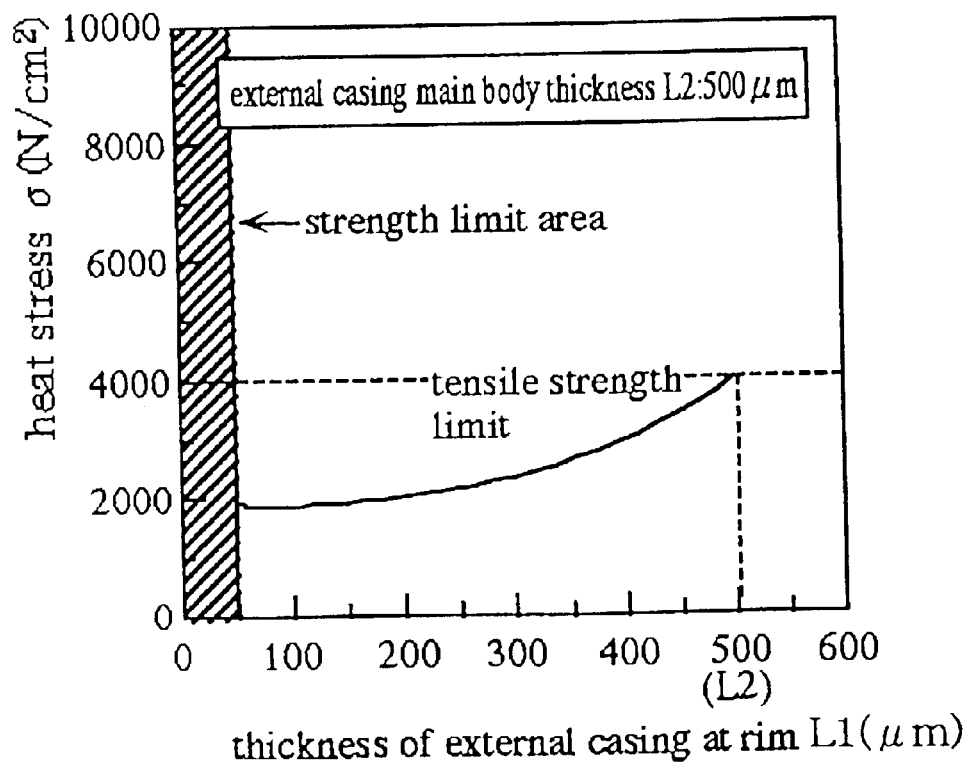
FIG. 10 is a plot showing the relationship between the rim of the external casing and the heat stress.

Further, the relationship between the thickness L1 of the external casing 10 at the rim 10a and the heat stress at the center of the heat spot is calculated when the thickness of the external casing 10 at the main body 10b is set as 500 $\mu$m. Here, the height T2 is set as 90 $\mu$m, the thicknesses T1, T3, and L2 are set as 500 $\mu$m. FIG. 10 is a plot showing the result.

As shown in FIG. 10, when the thickness L1 of the external casing 10 at the rim 10a is the same as the thickness L2 of the main body 10b, the heat stress at a molten pool is almost the same as the tensile strength limit (4×10$^3$N/cm$^2$). On the other hand, when the thickness L2 of the main body 10b of the external casing is fixed and the thickness L1 at the rim 10a is set as smaller, the heat stress becomes less. This shows that it is effective to set the thickness T1 of the external casing 10 at the rim 10a as no greater than the thickness T2 of the main body 10b in order to have the heat stress at a molten pool be less than the tensile strength limit and to prevent cracking.

As a result, considering the circumstances under which the thickness L1 of the external casing 10 at the rim 10a, which is decided according to the mechanical strength of the aluminum alloy plate, should be set as at least 50 $\mu$m, it is preferable to set the thicknesses L1 at the rim 10a and L2 at the main body 10b of the external casing 10 so as to satisfy Equation 5 given below.

$$50[\mu m] \geq L_1 \geq L_2 \qquad \text{[Equation 5]}$$

When the thickness L1 of the external casing 10 at the rim 10a is determined so as to satisfy the equation, the rim 10a and the rib 31b of the cover plate 31 are welded together more firmly. In this respect, it is preferable to determined the thickness L1 at the rim 10a so as to Equation 5.

Figure 11:
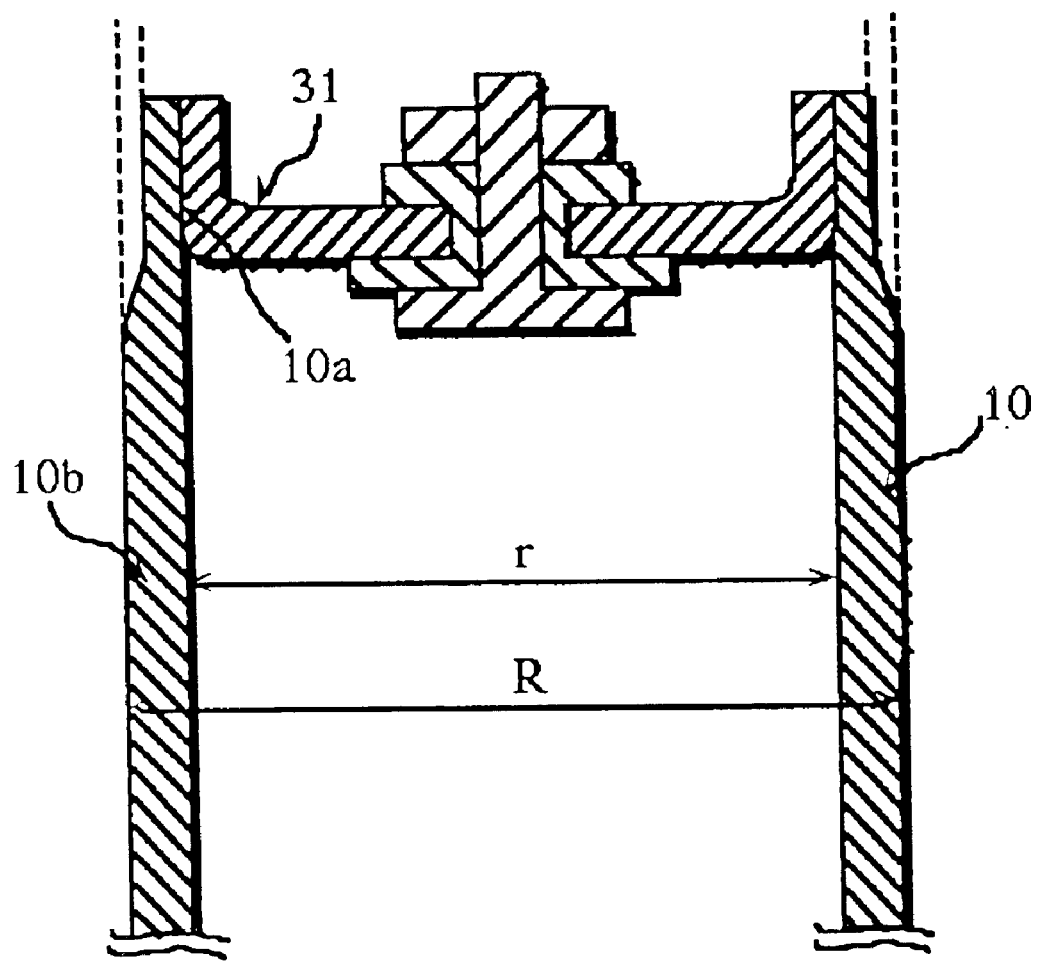
FIG. 11 is a sectional view of a possible modification of the sealed battery shown in FIG. 1.

In FIG. 4, the thickness L1 of the external casing 10 at the rim 10a is set smaller than the thickness L2 of the main body 10b so that the external diameter at the rim 10a is the same as that at the main body 10b and the internal diameter at the rim 10a is greater than that at the main body 10b. The thickness L1 may be set smaller than the thickness L2 so that the internal diameter r at the rim 10a is the same as that at the main body 10b and the external diameter at the rim 10a is smaller than that at the main body 10b as shown in FIG. 11. The thickness difference can be easily adjusted by making the diameter of the part of the die corresponding to the rim 10a smaller.

Note that it is preferable to set the internal and external diameters of the external casing as shown in FIG. 4 so that the smaller thickness of the external casing at the rim works effectively to fix the cover plate that is fit into the opening of the external casing.

(Practical Example)

A plurality of the batteries 1 are manufactured on condition that the thickness L1 of the external casing 10 at the rim 10a is set at 400 μm, the thickness L2 of the main body 10b at 550 μm, the thickness T1 of the flat part 31a of the cover plate 30 surrounded by the rib 31b at 500 μm, the height T2 of the rib 31b at 500 μm, the thickness T3 of the rib 31b at 400 Um, and the thickness of the insulating sleeve 26 as 800 μm. The laser radiation conditions are as described below. The incidence of cracking is checked. Note that the sizes of the elements used for manufacturing the batteries satisfy Equations 3 to 5.

Laser Radiation Conditions

Laser Wavelength: 1.064 μm (YAG laser)

Laser Pulse Repetition Rate: 50 pps (pulse/second)

Laser Spot Diameter: 500 μm

Laser Beam Scanning Speed: 15 mm/s (Comparative Example)

As the comparative example of the present invention, a plurality of sealed batteries are manufactured as follows. The conventional flat cover plate without rib and the conventional external casing the thickness at the rim is the same at the main body are used. The cover plate is fit into the opening of the external casing so that the top end of the rim and the upper surface of the cover plate have the same level. The cover plate and the external casing are welded together using a laser on the same laser radiation condition as described above. The incidence of cracking for the sealed batteries is checked. Note that the thickness of the external casing is set at 500 μm and that of the cover plate at 800 μm. The result of the experiment is shown in Table 1.

TABLE 1

| | incidence of cracking |
|---|---|
| present invention | <1.0% (less than 10%) |
| comparative example | 27.0% |

As shown in Table 1, as high as 27% for the comparison example, the incidence of cracking can be decreased as low as 1% for the practical example by manufacturing batteries using the cover plate and the external casing that have inventively-changed shapes.

This proves that the heat stress in the welded part can be reduced and eventually the cracking can be suppressed for a sealed battery that has been manufactured according to the first embodiment, i.e., proves the practical effectiveness of the manufacturing method.

Figure 12:
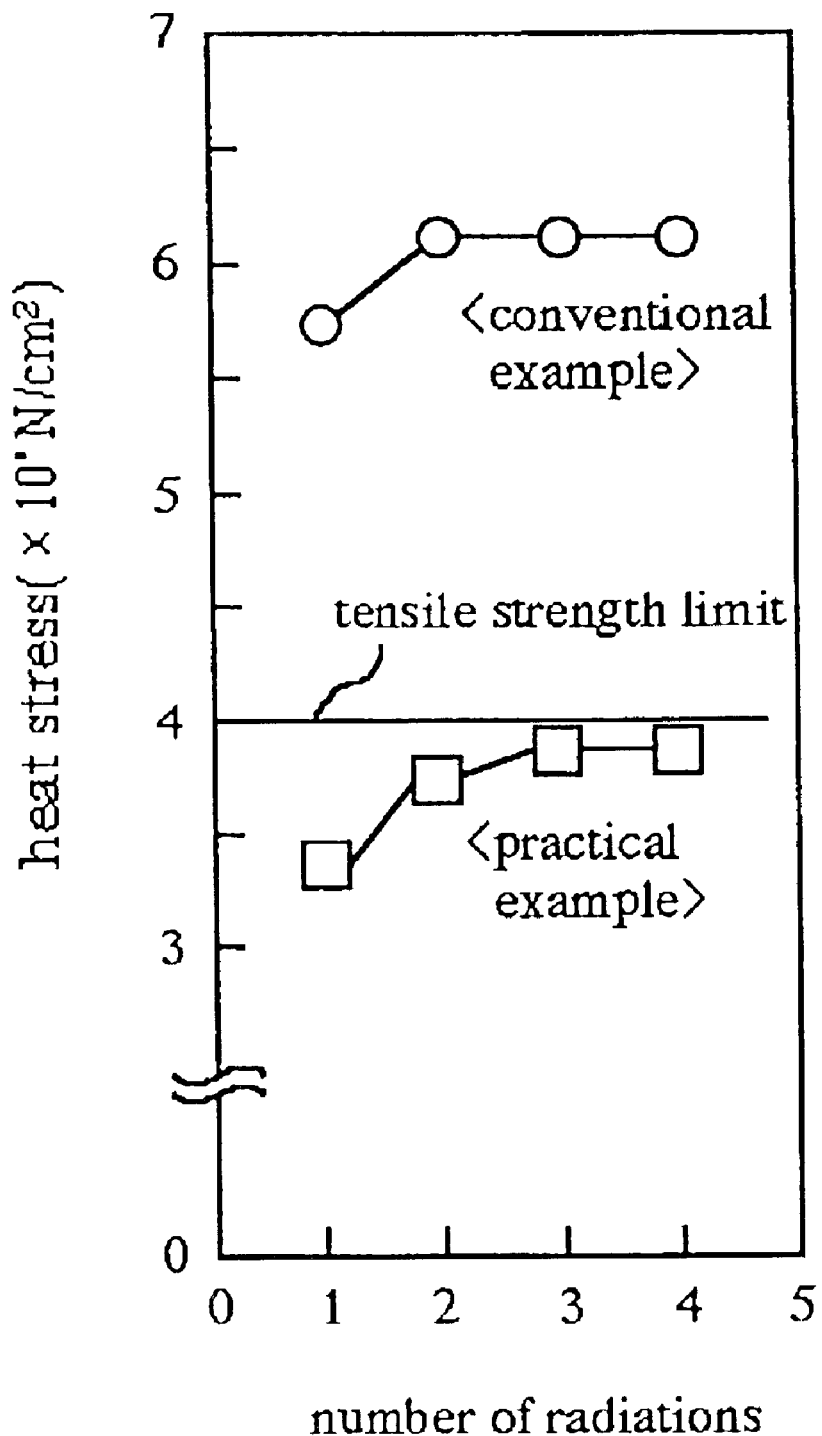
FIG. 12 is a plot showing the relationship between the number of laser radiations and heat stress.

FIG. 12 is a plot showing the heat stress in the molten part for each number of laser radiations.

The plot in FIG. 12 shows that the heat stress becomes slightly great at the second radiation but remains almost the same after that.

While the maximum value of the heat stress is about $6 \times 10^3 \text{N/cm}^2$ for the conventional manufacturing method, the maximum value for the manufacturing method according to the practical example is less than $4.0 \times 10^3 \text{N/cm}^2$.

Considering the fact that the tensile strength of the aluminum alloy used is about $4.0 \times 10^3 \text{N/cm}^2$ according to the manufacturing method of rectangular sealed battery of the practical example, it is concluded that this manufacturing method is effective to set the maximum heat stress as less than the tensile strength.

[The Second Embodiment]

A specific explanation of another embodiment will be given below in accordance with figures.

[Battery Structure]

Figure 13:
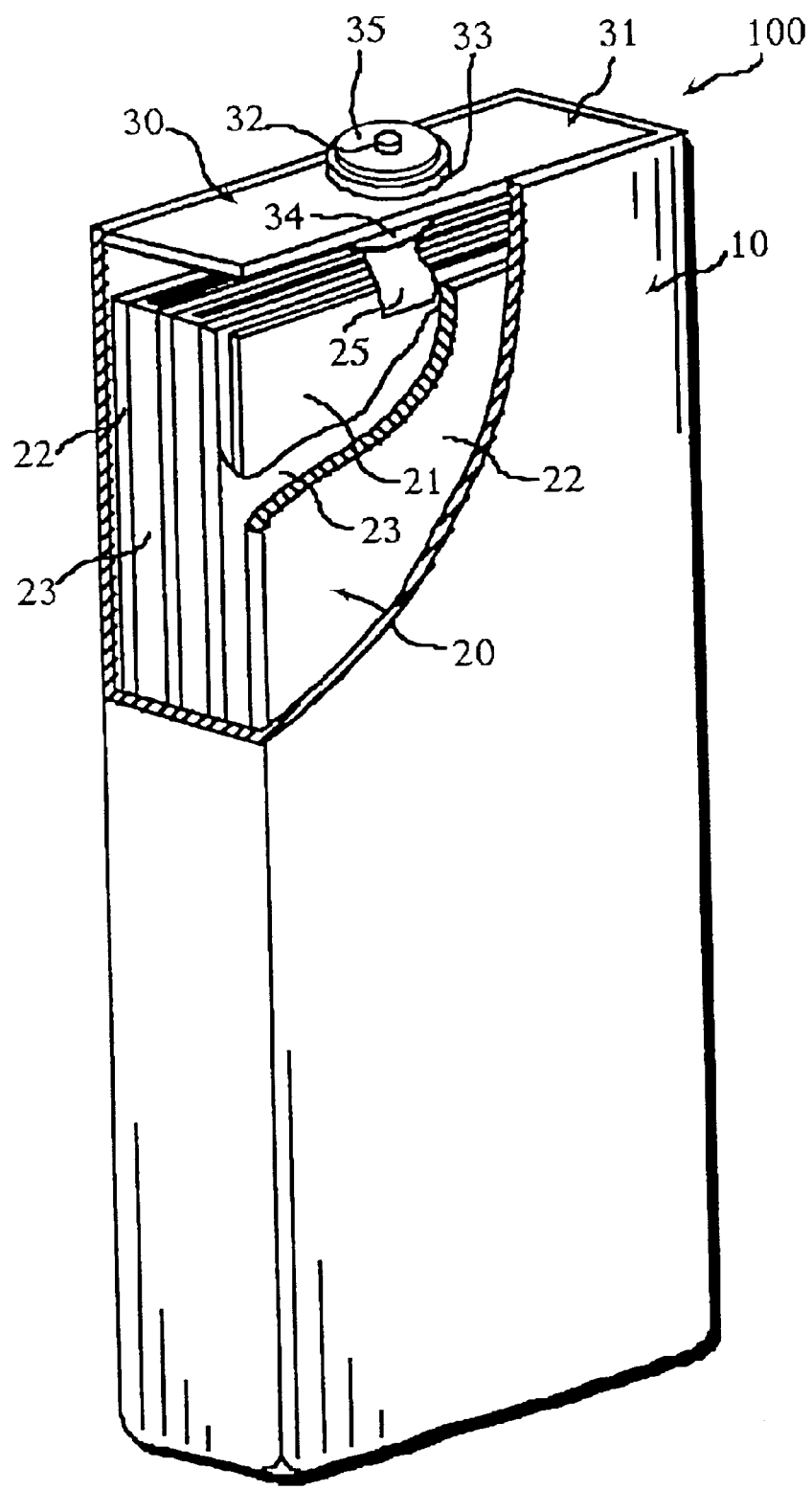
FIG. 13 is a perspective view, partly broken away to show the interior construction, of a sealed battery according to the second embodiment.

FIG. 13 is a perspective view of a rectangular sealed battery 100 according to another embodiment (referred to the "battery 100" hereinafter). In FIG. 13, the same elements as in FIG. 1 have the same reference numbers.

[Manufacturing Method of Battery]

An explanation of the method of manufacturing the battery 100. Note that the shapes of the cover plate 31 and the external casing are the same as in the conventional rectangular sealed battery. More specifically, the cover plate 31 is a flat plate and the thickness of the external casing is designed to be the same at the rim 10a and at the main body.

Figure 14:
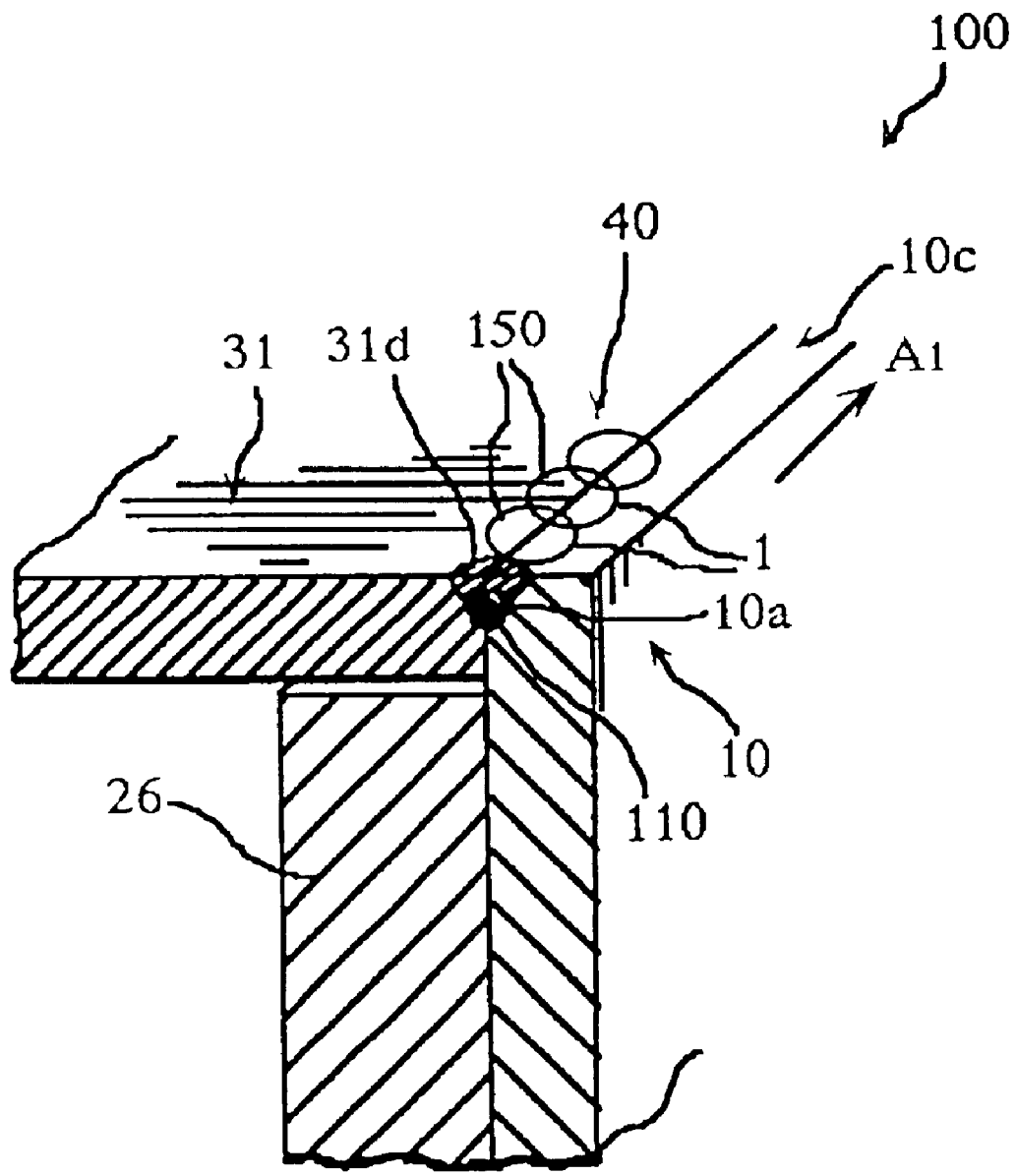
FIG. 14 is an enlarged sectional view of the main structure of the sealed battery in FIG. 13.

FIG. 14 is an enlarged sectional view of the main structure of the battery 100 when the cover plate 31 is fit into the opening of the external casing 10. FIG. 14 shows a part of the battery 100 around the outer edge of the cover plate 31 and the rim of the external casing.

First, the external casing 10 is made by forming an Al—Mn alloy plate into a bottomed rectangular cylinder. Meanwhile, the cover plate 31 is made by punching out an Al-Mn alloy plate.

More specifically, the external casing 10 is formed by transfer drawing an aluminum alloy flat plate using a punch or an ironing die. On the other hand, the cover plate 31 is made by punching out an aluminum alloy flat plate using a punch.

Then, a group of predetermined elements (including the insulating packing, the negative electrode terminal, and the electrode collector plate) is attached to the cover plate 31 and the washer is attached to the negative electrode terminal at the top by caulking to form the closure cap 30.

Next, into the external casing 10, the electrode group, which has been made, is inserted, and the negative electrode and the collector plate are electrically connected. Then, the electrolyte is poured into the external casing 10, and the closure cap 30 is press-fit into the external casing 10 so that the top end 10c of the external casing 10 and the upper surface 31d of the closure cap 31 have the same level.

The outer edge of the cover plate 31 and the rim of the external casing 10 are welded together by aiming a laser at the boundary 40 between the outer edge and the rim. By doing so, the battery 100 is completed.

[Sealing with Laser Welding]

Figure 15:
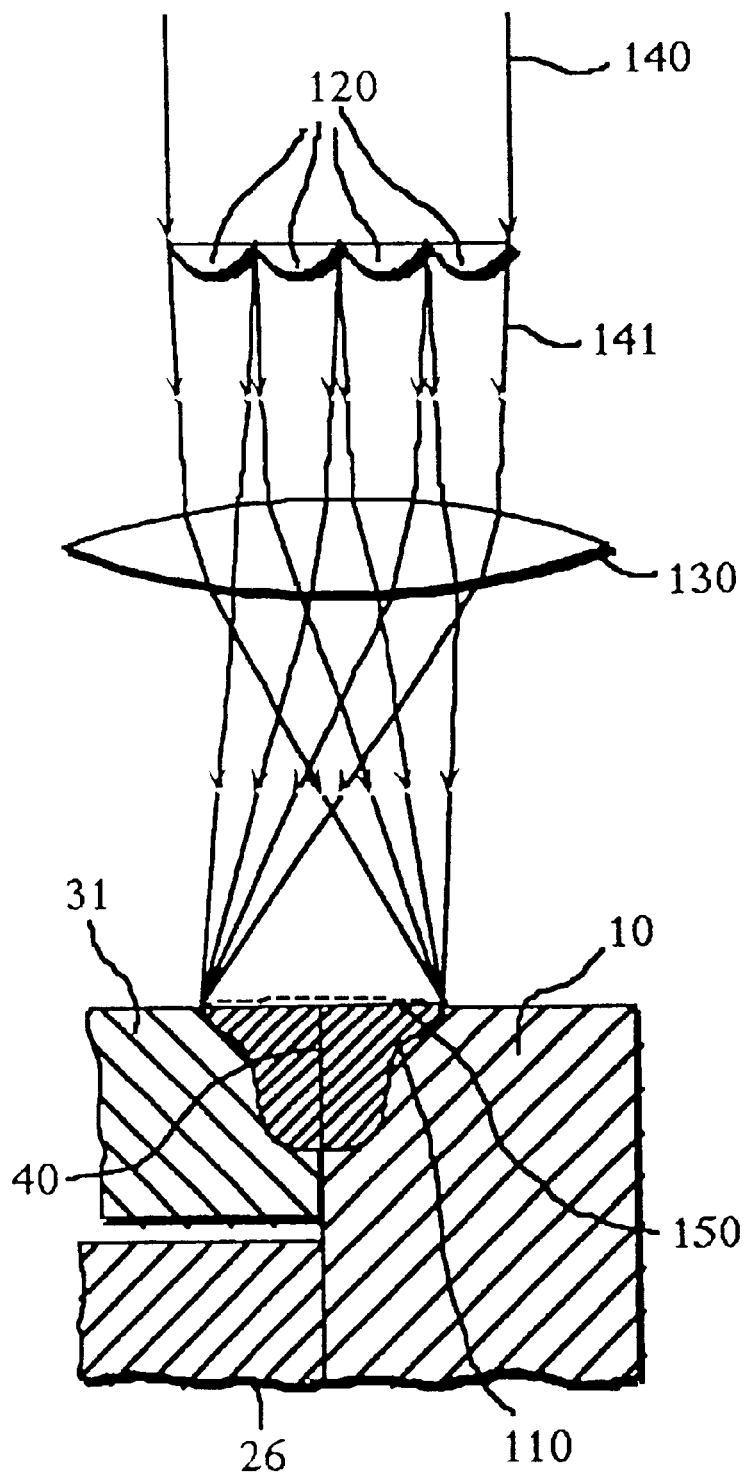
FIG. 15 is a plan view showing how the external casing is sealed with laser welding.

FIG. 15 is a plan view showing how the external casing is sealed with laser welding.

The device shown in FIG. 15 includes beam homogenizers 120 . . . and a projection lens 130 for projecting light pencils generated by the beam homogenizers 120 . . . . The beam homogenizers 120 . . . and the projection lens 130 are integrally driven in any direction in a plane parallel with the cover plate 31.

The beam homogenizers 120 . . . are process lenses for dividing a laser 140, which has been guided from the laser oscillator (not illustrated) via the optical fiber, into finer light pencils 141 . . . .

The projection lens 130 projects the light pencils 141 . . . onto a place including the boundary 40, which is the part to be welded, so that the centers and the diameters of the light pencils 141 . . . overlap one another to form a round laser spot.

As has been described, the laser 140 is divided into finer light pencils and the divided laser is radiated so as to overlap to generate a laser spot 150, which has the highest energy at the center and the energy does not substantially change around the center (a detailed explanation of the influence will be given later).

The laser oscillator has yttrium-aluminum-garnet (YAG) emit light and outputs the pulsed laser 140 (for instance, laser pulse repetition rate: 50 pps).

In the part corresponding to the laser spot 150 on which the laser has been radiated, the outer edge of the cover plate 31 and the rim of the external casing 10 melt to form a molten pool. The molten pool solidifies in a short period of time. In FIGS. 14 and 15, the reference number 110 indicates a welded part, which is a solidified molten pool.

Note that inert gas (nitrogen gas, not illustrated) is emitted to the part surrounding the laser spot 150 to prevent the welded part from oxidizing.

As in the case of the first embodiment, the laser pulse repetition rate of the laser oscillator and the scan speed of the laser spot 150 are adjusted so that the laser spot 150 and an immediately preceding spot have a moderate overlap (generally, 40 to 60% overlap ratio).

The laser spot 150 is radiated so that the center of the flat part of the energy distribution is positioned at the boundary 40. The center of the laser spot, where the energy is greatest, is positioned at the boundary 40 in order to weld the external casing and the cover plate together most firmly where the external casing and the cover plate come into contact. Certainly, this welding causes no heat damages to the surrounding elements (for instance, the insulating sleeve 26). Only the part corresponding to the laser spot 150 is locally molten.

As has been described, while the laser is projected onto the boundary 40 by the projection lens 130, the boundary 40 is scanned by moving the beam homogenizers 120 . . . and the projection lens 130 integrally along the boundary 40 (in the direction of an arrow "A1" in FIG. 14) to consecutively form welded parts 110 along the boundary 40. When the welding of the external casing and the cover plate along the boundary 40 is completed, the sealing is finished.

[Laser Beam Energy Distribution and the Influence on Welding]

Figure 16:
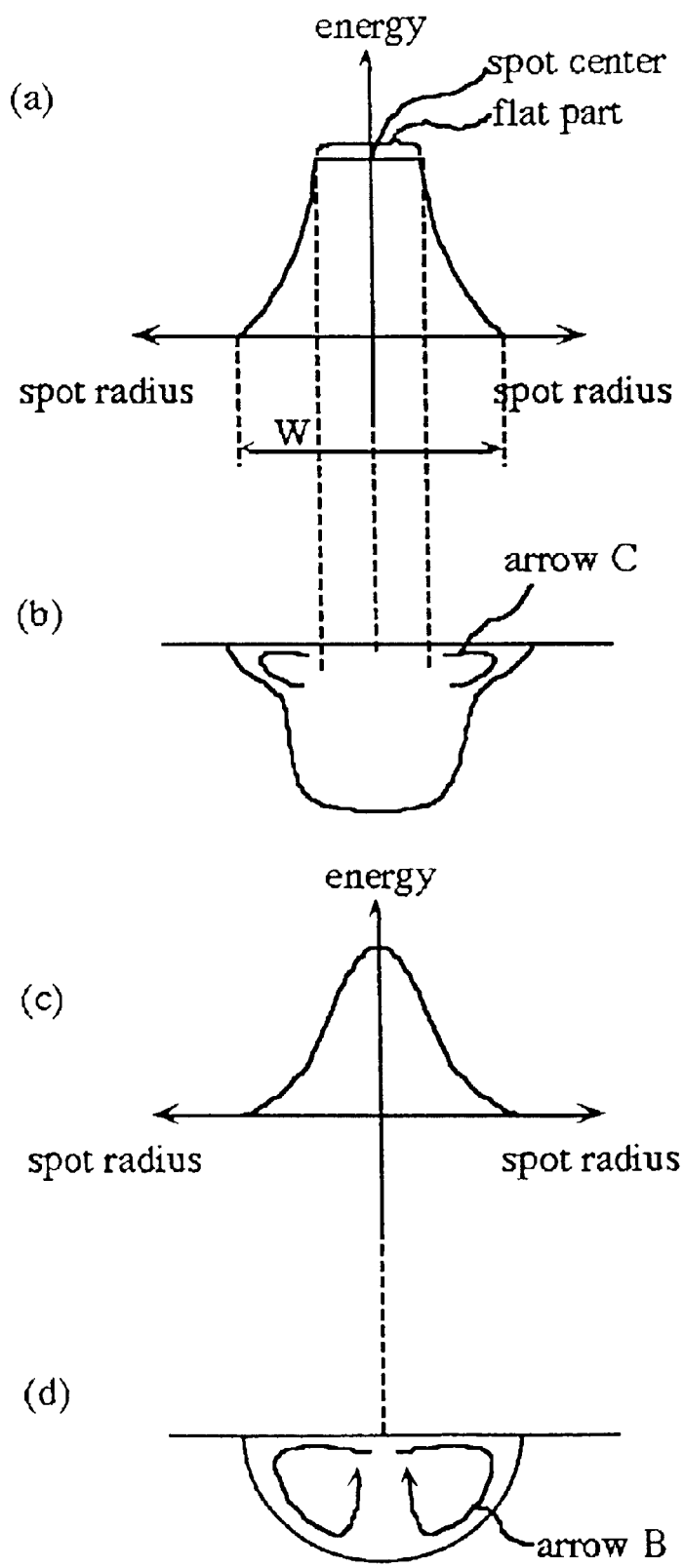
FIG. 16 shows energy distribution of laser and sectional views of molten pools.

The energy distribution of the laser used in the sealing process is shown in FIG. 16(a). For reference purposes, the energy distribution of the laser that has been conventionally used is shown in FIG. 16(c).

FIGS. 16(a) and 16(c) show the energy distribution from the center to the edge of a round laser spot with reference to the energy at the center.

As shown in FIG. 16(a), the energy distribution of the laser spot is different from a general Gaussian distribution.

More specifically, as shown in FIG. 16(a), there is a flat part around the center of the laser spot where the energy does not substantially change.

This energy distribution restricts the phenomena of molten metal flowage, i.e., the Marangoni convection.

The lower the temperature, the higher the surface tension of molten metal. As a result, molten metal with higher temperature is pulled by molten metal with lower temperature. This leads to the flowage of the molten metal. In the case of the laser with the energy distribution as the Gaussian distribution shown in FIG. 16(c), the energy is greatest at the center of the laser spot and smallest at the edge. As a result, the temperature of a molten pool is highest at the center of the laser spot and lowest at the edge. This temperature gradient generates a flowage (Marangoni convection) of molten metal that circulates in the order of the top center of the molten pool, the edge, the bottom, and the top center (as indicated by arrows "B" in FIG. 16(d)). As a result, dome-shaped welded mark is formed.

On the other hand, the laser in the present embodiment has the energy distribution with a flat part as has been described. In the molten pool corresponding to the flat part has no substantial temperature gradient. As a result, the Marangoni convection due to temperature gradient can be-restricted in the molten pool.

The local restriction of the Marangoni convection leads to effective transmission of laser energy to the bottom of the molten pool, so that the boundary 40 can be molten more deeply (refer to FIG. 16(b)). As a result, a battery with improved sealing can be obtained. Note that some degree of Marangoni convection (as indicated by arrows "C" in FIG. 16(c)) arises at the edge of a laser spot, so that a so-called silk-hat-shaped welded mark (which will be described later) is formed.

In addition, the restriction of the Marangoni convection can reduce the heat stress. The heat stress arises when a molten pool is rapidly cooled and the degree of heat stress depends on the fluidity of the molten metal. More dynamically the molten metal flows, more strongly the molten metal is pulled, so that the heat stress becomes greater. As a result, the restriction of the Marangoni convection can reduce the heat stress that arises from the molten metal flowage. In addition, the heat stress is expressed by a function of temperature change as indicated by Equation 2, so that easy temperature gradient can reduce the heat stress. As has been described, the heat stress can be reduced in the welded part, so that cracking can be suppressed.

Note that the effect can be obtained only when energy is distributed so that the temperature gradient of the molten metal is easier than the conventional beam having the Gaussian distribution.

Meanwhile, the effect of heat stress reduction depends on the ratio of the flat part of the energy distribution of the beam to the laser spot. More specifically, if the flat part proportion is too small, the temperature gradient is seen in a relatively wide range, so that the Marangoni convection cannot be restricted. As a result, the flat part proportion needs to be determined in consideration of the diameter of the beam spot.

In addition, the energy change in the flat part is allowable as long as the effects of restricting the Marangoni convection and cracking are obtained. In this respect, the flat part does not indicate that the energy never changes in this part.

Especially, the effect is profound when Equation 6 given below is satisfied.

[Equation 6]

Notes: Not explained in detail, the grounds are derived from the simulation analysis under the conditions described below.

Main conditions of the simulation are as follows.

The thickness of the external casing 10 and the cover plate 31; 500 $\mu$m

The YAG laser wavelength; 1.064 $\mu$m

The diameter of the radiation spot; 600 $\mu$m

The radiation energy; 60W, 70W, or 80W per spot

Note that the energy distribution satisfying Equation 6 cannot be obtained by the laser having the Gaussian distribution. As is evident from the fact that the energy I(x) of the Gaussian distribution is indicated in Equation 7 described below, the part in which the energy fluctuation from the energy at the center is less than 5% accounts for less than 20% of the laser spot.

[Equation 7]

[Shape of Welded Mark]

Welding by the laser having the energy distribution that has been described, a welded mark 110 has a unique shape different from the conventional welded mark.

Figure 17:
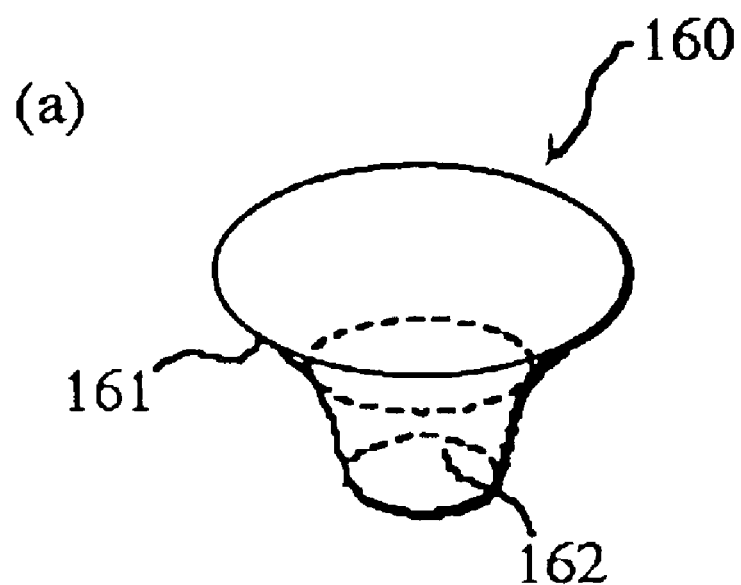
FIG. 17 shows a form of welded mark.
Figure 17:
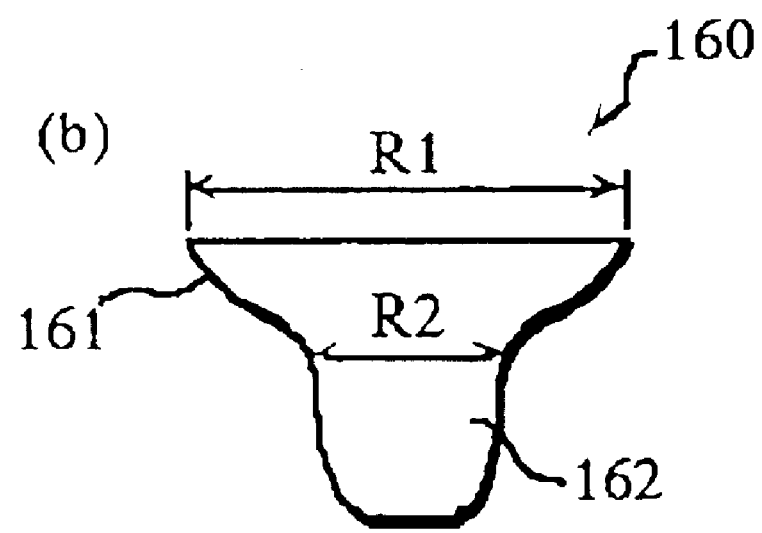

FIG. 17(a) is a perspective view of a welded mark 160 formed by a laser spot for welding the external casing and the cover plate and FIG. 17(b) a sectional view of the central part of the welded mark.

FIGS. 17(a) and 17(b) show that the welded mark 160 is formed as follows. In the part corresponding to the diameter of the flat part at the center of the laser spot, a molten pool is formed by going straight. In the upper part of the molten pool (the outer regions of the laser spot), some amount of Marangoni convection arises. As a result, a so-called silk-hat-shaped welded mark is formed by a planiform dome-shaped first welded mark 161 that has a gently-curved boundary between the non-molten part and a second welded mark 162 that has an upper diameter R2, which is smaller than an upper diameter R1 of the first welded mark 162.

Here, formed by the go-straight energy of the laser spot corresponding to the flat part of the laser spot energy distribution, so that the second welded mark 162 has a boundary between the non-molten part that is steeper than that of the first welded mark 161.

On the other hand, when the external casing and the cover plate are welded with a laser having the Gaussian distribution, the Marangoni convection arises in the molten pool as a whole, so that a dome-shaped welded mark is formed.

As has been described, the shape of the welded mark formed by a laser spot according to the welding method of the present embodiment is quite different from that in a conventional method. Due to the unique shape of the welded mark, when the total amount of the energy of the laser spot is set the same, the degree of the progress (depth) of the welded part in the direction of laser radiation (in the perpendicular direction) is greater in the case of the present embodiment, so that better sealing quality can be obtained according to the present embodiment.

In reality, however, laser is consecutively radiated and welding is consecutively performed, so that the form of the welded part 110 that is formed in the boundary 40 is different according to the laser pulse repetition speed of the laser oscillator and the scan speed of the laser spot. More specifically, the overlap ratio of the laser spot 150 differs according to the laser pulse repetition rate and the laser spot scan speed, and the shape of the welded mark differs according to the overlap ratio.

For instance, in the case of laser radiation in which the outer regions of laser spots slightly overlap one another (in case 1), a series of welded marks having almost the same shape as the welded mark 160 are formed.

Figure 18:
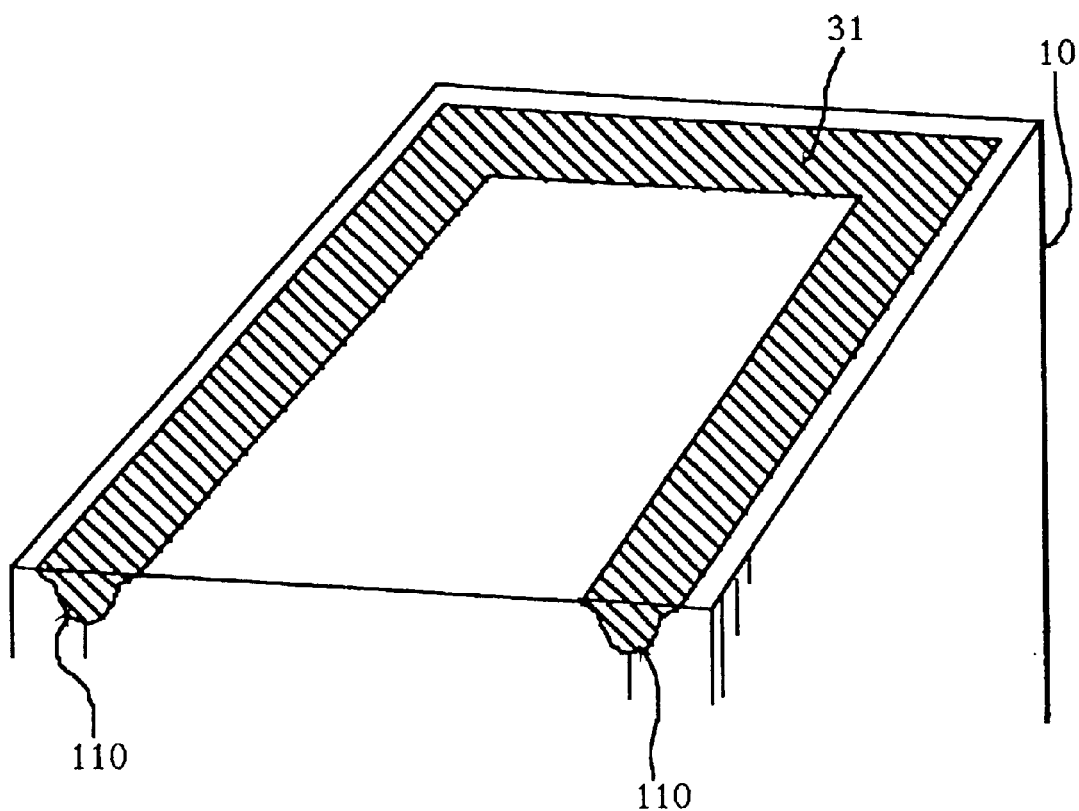
FIG. 18 shows an example of shape of welded mark that is formed at the boundary between the external casing and the cover plate.

On the other hand, in the case in which the regions of laser spots closer to the centers overlap one another (in case 2), since the parts corresponding to the flat part of the energy distribution have overlaps, the vertical sectional view of the welded part in the direction of the laser is the same as the shape shown in FIG. 17(b). The vertical sectional view is shown in FIG. 18. The welded mark having so-called silk-hat-shaped vertical sectional view is formed along the outer regions of the upper part of the battery.

As in the case of the conventional method, the welded part has different shape according to the overlap ratio of the laser spot. In the case 1, however, a series of dome-shaped welded marks is formed as a whole, and in the case 2, the welded mark has the dome-shaped vertical sectional view in the direction of the laser radiation.

As has been described, the shape of the welded part that is finally formed along the boundary between the external casing and the cover plate in the present embodiment is totally different from that in the conventional method. More specifically, in the case of the sealed battery of the present embodiment, the second welded part that goes straight in the direction the height of the molten pool is formed, so that the welded mark has the shape so as to secure larger welded area of the external casing and the cover plate compared with the conventional welding method. As a result, the battery has an improved sealing effect of separating the generator elements from outside of the battery, i.e., the battery is resistant to electrolyte leakage and has higher security and reliability.

Note that it is preferable that the boundary is scanned so that the flat parts of the welded marks overlap one another in the respect of sealing quality improvement since the welded regions become larger.

(Practical Example)

Rectangular sealed batteries are manufactured according to the present embodiment.

The thickness of the external casing 10 and the cover plate 31 is 500 $\mu$m.

At the time of welding, the YAG laser wavelength is 1.064 $\mu$m, the diameter of the radiation spot is 500 $\mu$m, and the radiation energy is 60W, 70W, or 80W per spot.

(Comparative Example)

Rectangular sealed batteries are manufactured in the same manner as the practical example except for the energy distribution of the laser.

(Experiment 1)

Sealed batteries are manufactured in the method of the practical and experimental examples, and the heat stress is analyzed. The result of the analysis is shown in Table 2. Note that the greatest heat stress at the part where the laser has been radiated is written in Table 2.

[Table 2]

As is evident from Table 2, in the welding according to the practical example, the heat stress is considerably reduced.

(Experiment 2)

Batteries are manufactured in the method of the practical and comparative examples, and the yield ratio (the ratio of batteries without cracking) is checked.

As a result, in the welding according to the practical example, the incidence of cracking is considerably reduced compared with the comparative example. The yield ratio of the practical example in the manufacturing method described above is no less than 95%.

While the shape of the laser is changed with the beam homogenizers and the projection lens in the explanation, the devices are not limited to the beam homogenizers and the projection lens. For instance, the laser shape can be changed with an expander, a mask, and a projection lens. More specifically, the laser from the laser oscillator is expanded with the expander and the central part is projected onto the welded part with the mask and the projection lens to form the flat part.

While the laser spot has the shape of circle in the present embodiment, the shape of the laser spot is, not limited to a circle. The laser spot can be an oval figure or a polygon. Note that when the laser spot has a shape other than a circle, the spot diameter W can be indicated by the maximum diameter passing the barycenter of the laser spot, for instance.

[The Third Embodiment]

An explanation of a further embodiment will be given below.

Figure 19:
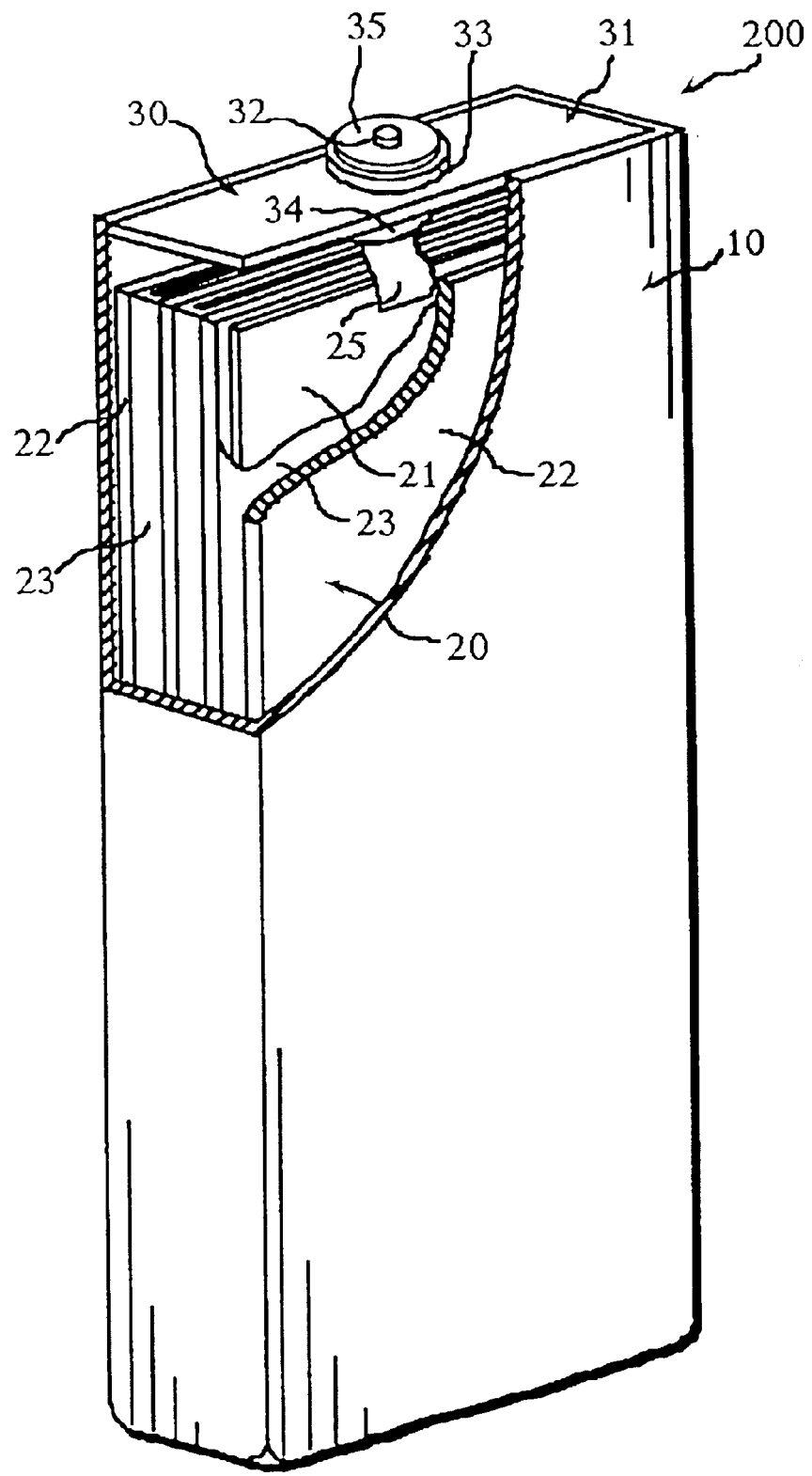
FIG. 19 is a perspective view, partly broken away to show the interior construction, of a sealed battery according to the third embodiment.

FIG. 19 is a perspective view of a rectangular sealed battery 200 (referred to the "battery 200" hereinafter) according to the present embodiment. In FIG. 19, the same elements as in FIG. 13 have the same reference numbers.

In respect of manufacturing the battery 200, the methods of making the cover plate, the external casing, and the other elements are the same as in the second embodiment, so that any more explanation of the manufacturing method of these elements will not be given.

Here, the method of welding the cover plate and the external casing is different from that in the second embodiment. A detailed explanation of the welding method will be given below.

[Sealing with Laser Welding]

Figure 20:
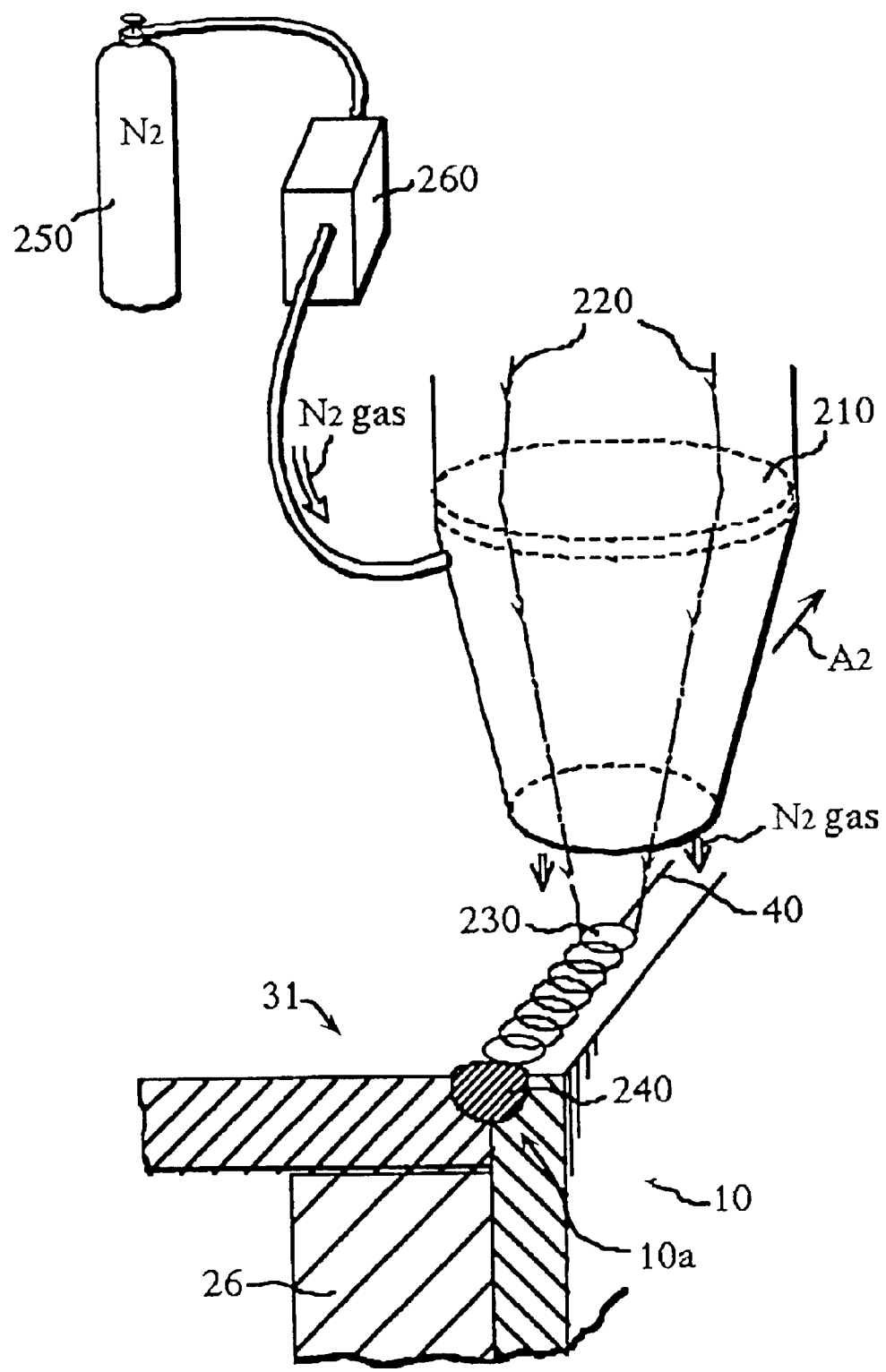
FIG. 20 is a perspective view showing how the external casing is sealed with laser welding.

FIG. 20 shows how the external casing is sealed with laser welding.

Among the devices shown in FIG. 20, a condenser lens 210 can drive the optical axis in any direction in a plane parallel to the cover plate 31. To the condenser lens 210, a laser 220 from the laser oscillator (not illustrated) is guided via an optical fiber.

The laser oscillator has yttrium-aluminum-garnet (YAG) emit light and outputs the pulsed laser 220 (for instance, laser pulse repetition rate: 50 pps).

The laser 220 converges on the boundary 40 between the cover plate 31 and the rim 10a of the external casing 10 by passing through the condenser lens 210 to form a small round spot 230 (the spot diameter: few hundred $\mu$m).

By doing so, the part corresponding to the spot 230 is locally molten without inflicting any heat damage on the elements (for instance, the insulating sleeve 26) surrounding the molten part.

In the part corresponding to the spot 230 on which the laser 220 has been radiated, parts of the cover plate 31 and the rim 10a of the external casing 10 are molten to form a molten pool. The molten pool solidifies in a short period of time. In FIG. 20, the reference number 240 indicates a welded part where a molten pool has solidified.

The laser pulse repetition rate of the laser oscillator and the scan speed of the condenser lens 210 are adjusted so that the laser spot 230 of the laser 220 and an immediately preceding spot have a moderate overlap (generally, 40 to 60% overlap ratio).

With the radiation of the laser 220, $N_2$ gas supplied from an $N_2$ gas container 250 is emitted onto the spot 230 of the laser 220 as the assist gas (amount of flow: 5 liters/min, for instance). Welding in the atmosphere of the emitted assist gas is to prevent the oxidation of the welded part.

The assist gas is supplied to the part to be welded after heated to a high temperature by a heating device 260 that is provided with a heater.

As a result, the molten pool that is formed at the part corresponding to the spot 230 is gradually cooled in the atmosphere of the high gas to ease the heat stress and decrease the incidence of cracking in the welded part. Note that even the assist gas is heated, the welded part is locally heated, so that no heat damage is inflicted on the generator element and the like in the battery.

While a more detailed explanation will be given later, it is preferable to set the heat temperature of the assist gas at no lower than 400K in order to obtain enough effects of restricting the cracking in the welded part.

Note that apart from nitrogen gas, hydrogen gas, oxygen, and inert gas such as argon gas can be used as the assist gas.

As has been described, by moving the condenser lens 210 along the boundary 40 (in the direction of an arrow "A2" in FIG. 20) while the laser 220 is converged on and projected onto the boundary 40 and the heated assist gas is emitted onto the boundary 40, welded parts 240 are consecutively formed along the boundary 40. When the welding of the external casing and the cover plate along the boundary 40 is completed, the sealing is finished.

[Relationship between Assist Gas Temperature and Heat Stress]

The relationship between the temperature of the assist gas that is emitted onto the welded part at the time of welding, the temperature history of the welded part, and the heat stress in the welded part (the heat stress at the center of the spot) is analyzed according to the finite-element method.

The heat stress at the center of the spot is analyzed since the heat stress in the laser welding is greatest at the center of the spot and is supposed to be responsible for the cracking as has been described.

The analysis according to the finite-element method is performed under the conditions described below.

The thickness of the external casing 10 and the cover plate 31: 500 $\mu$m

The laser wavelength: 1.064 $\mu$m

The power density of the laser: $1.5 \times 10^6$ W/cm² per spot

The spot diameter of the laser: 450 $\mu$m

The pulse width: 3.0 ms

The analytical time from the laser radiation: 5.0 ms

The cover plate melting point: 930K

Figure 21:
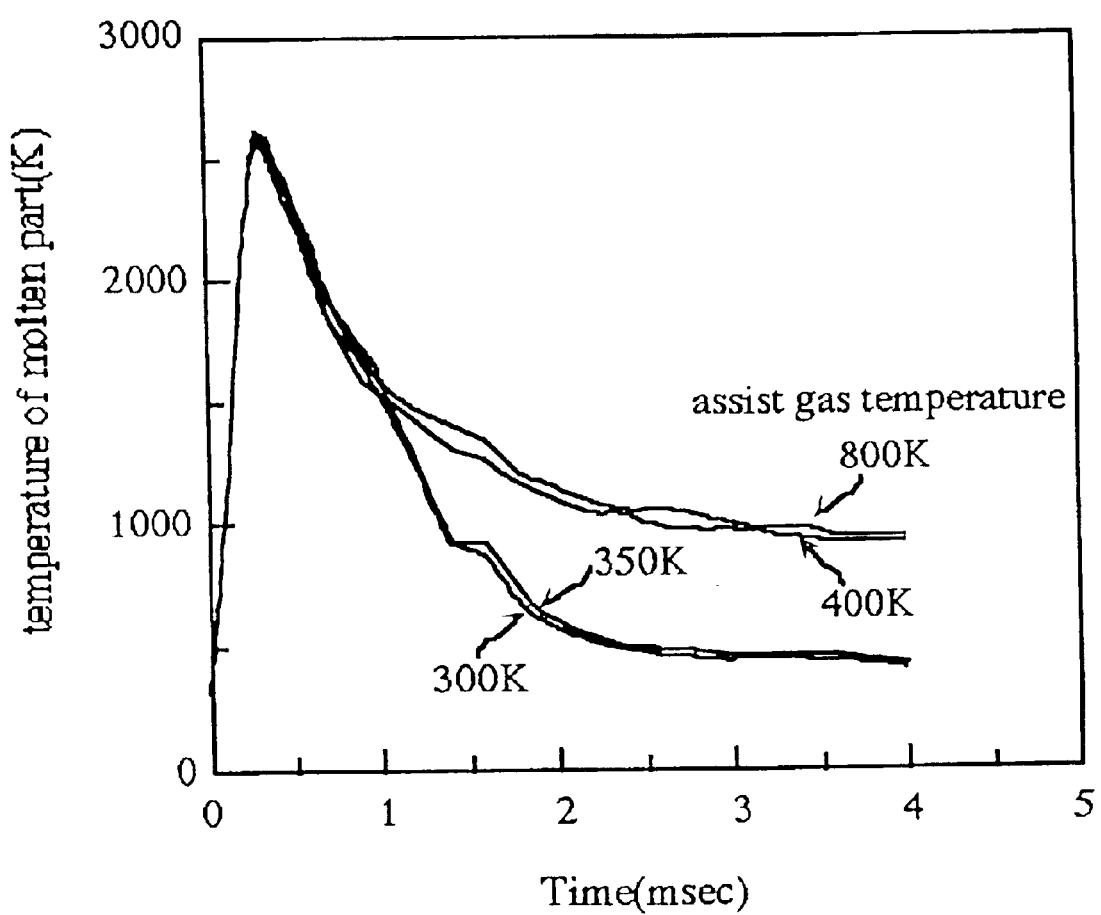
FIG. 21 is a plot showing the temperature history of the molten part when the temperature of assist gas is changed.
Figure 22:
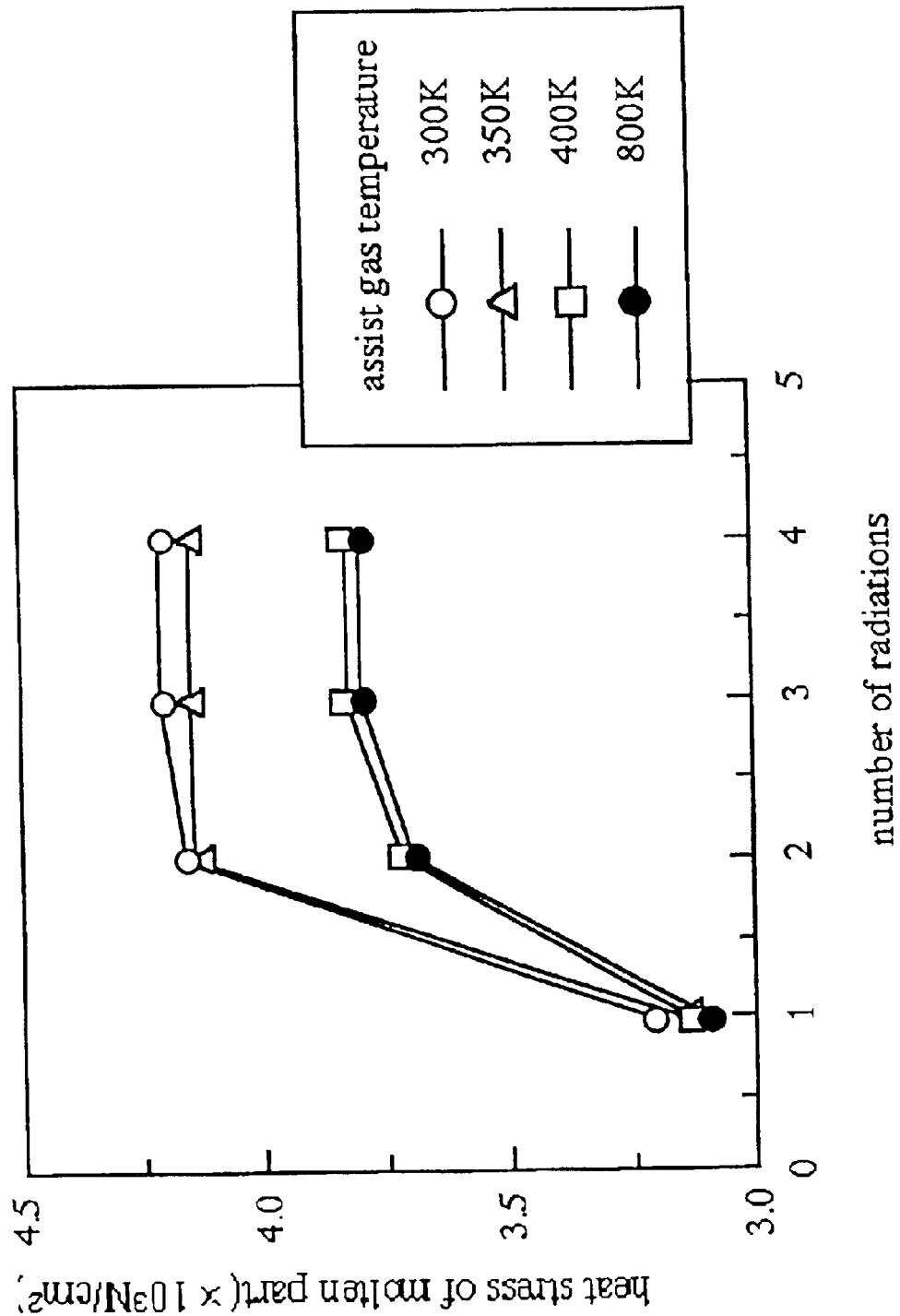
FIG. 22 is a plot showing the heat stress in the molten part for each number of laser radiations when the temperature of assist gas is changed.

The temperature at which heat starts to effect the resin of the insulating sleeve 26: 600K FIGS. 21 and 22 are plots showing results of the analysis. FIG. 21 shows the temperature history of the molten part (molten pool) when the temperature of the assist gas is set at 300K, 350K, 400K, and 800K.

The plot in FIG. 21 shows that the temperatures of the molten part are the same until about 1 ms has elapsed since the start of the laser radiation (until just after the molten part reaches at the maximum temperature) regardless of the difference of the assist gas temperature. After that, however, the molten part temperatures is quite different according to the assist gas temperature. More specifically, the speed at which the molten part cools is quite different when the assist gas temperature is equal to or lower than 350K and the temperature is equal to 400K or higher than 400K.

For instance, when the assist gas temperature is 300K and 350K, the temperature of the molten part decreases to 1000K after about 1.5 ms have elapsed. On the other hand, when the assist gas temperature is 400K and 800K, the molten part temperature decreases to 1000K after about 3 ms have elapsed.

The result shows that when the assist gas is set at a high temperature no lower than 400K, the molten part temperature can be kept at no lower than the melting point (about 930K) for at least 3 ms.

FIG. 22 is a plot showing the heat stress in the molten part for each number of laser radiations when the assist gas temperature is set at 300K, 350K, 400K, and 800K.

The plot in FIG. 22 shows that the heat stress becomes slightly great at the second radiation but remains almost the same after that.

Meanwhile, when the assist gas temperature is 300K and 350K, the maximum heat stress is about $4.2 \times 10^3$ N/cm². On the other hand, when the assist gas temperature is 400K and 850K, the maximum heat stress is less than $4.0 \times 10^3$ N/cm².

As a result, when considering the tensile strength of the aluminum alloy used for the rectangular sealed battery of the present embodiment is about $4.3 \times 10^3$ N/cm², it is understood that the assist gas is preferably set at no lower than 400K in order to set the maximum heat stress as less than the tensile strength.

According to the results shown in FIGS. 21 and 22, it is assumed that the maximum heat stress in the welded part should be set as no greater than $4.3 \times 10^3$ N/cm² at the time of laser radiation for the aluminum-manganese alloy in order to keep the cracking incidence low and set the maximum heat stress in the welded part as lower than the tensile strength of the material of the external casing. It is understood, however, that the welded part temperature can be kept at no lower than the melting point for at least 3 ms and the maximum heat stress in the welded part can be kept as no greater than $4.3 \times 10^3 \text{N/cm}^2$ by setting the assist gas at no lower than 400K.

[Experiment]

An experiment is performed as follows. The assist gas temperature is set at 300K, 350K, 400K, and 800K, batteries are manufactured with laser sealing (at the scan speed of 18 m/sec), and the yield ratio is checked.

Figure 23:
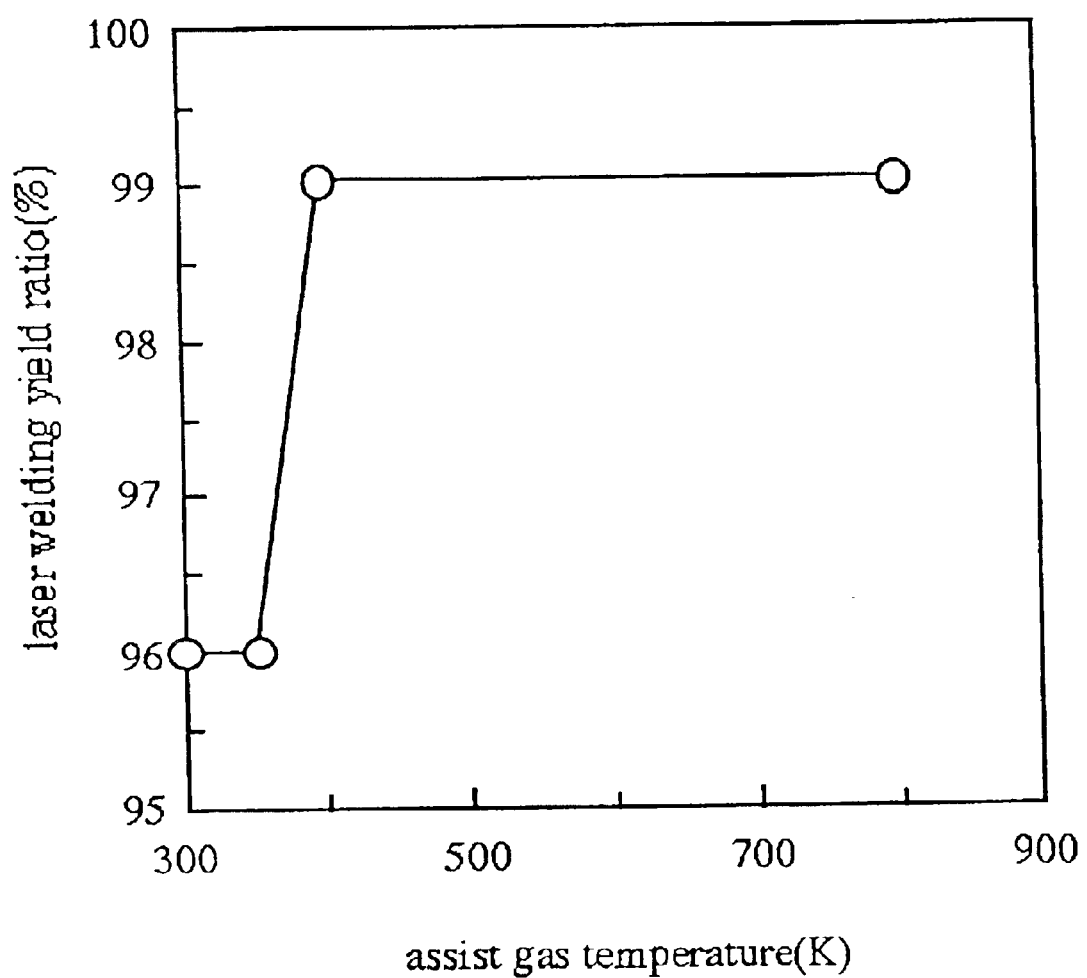
FIG. 23 is a plot showing the relationship between the temperature of the assist gas and the yield ratio.

FIG. 23 shows the result of the experiment. FIG. 23 is a plot showing the relationship between the assist gas temperature and the yield ratio.

According to the result, while the yield ratio is 96% when the assist gas temperature is 300K and 350K, the yield ratio is 99% when the assist gas temperature is 400K and 800K.

This proves that it is preferable to set the assist gas temperature at no lower than 400K in order to suppress cracking.

[The Fourth Embodiment]

Figure 24:
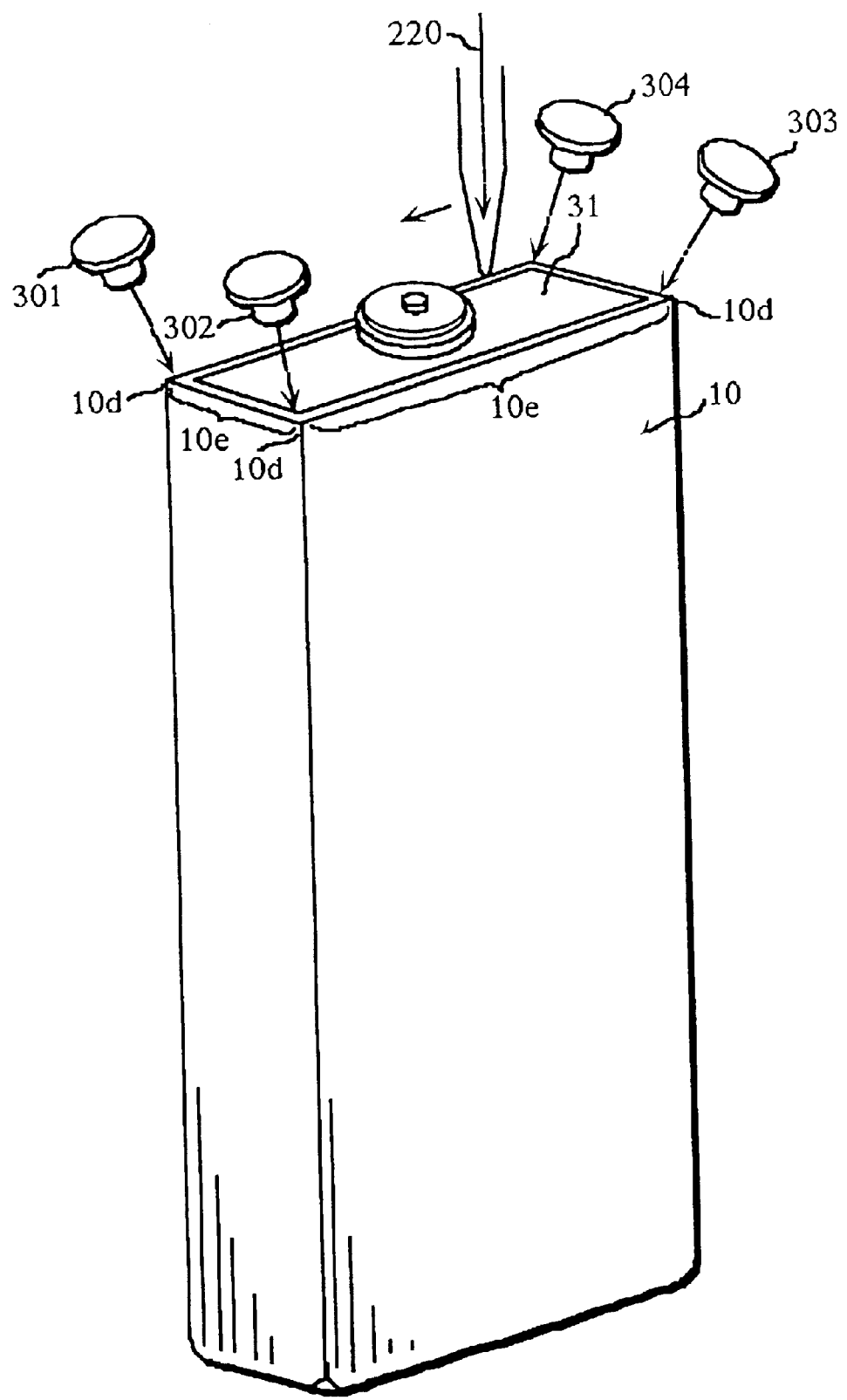
FIG. 24 shows how the external casing is sealed with laser welding when a sealed battery according to the fourth embodiment is manufactured.
Figure 25:
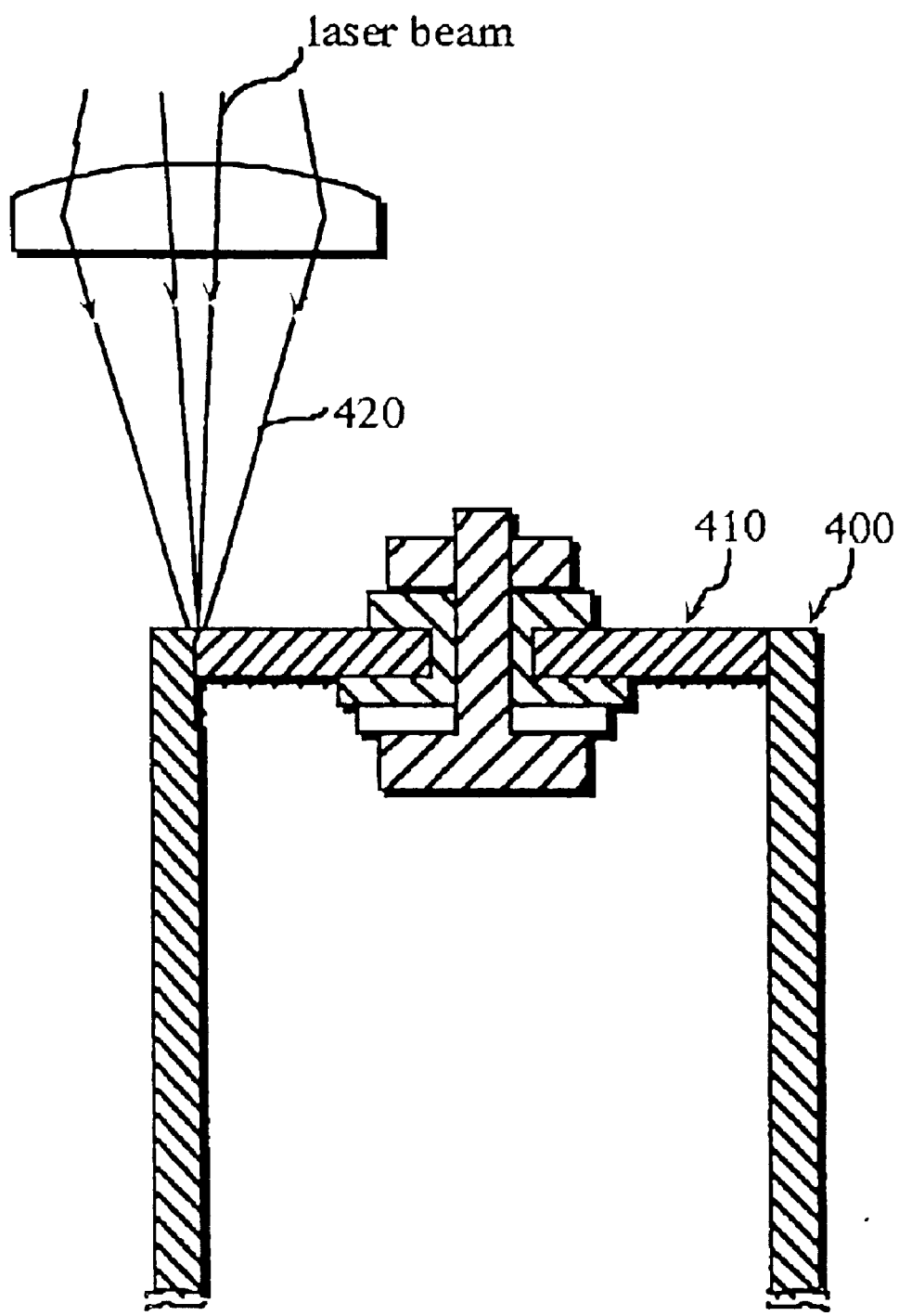
FIG. 25 is a conceptual diagram showing the method of manufacturing a conventional sealed battery and a plan view showing how the outer casing is sealed with laser welding.

FIG. 24 shows the laser sealing according to the present embodiment.

The molten part is kept warm by the heated assist gas when being cooled during the laser sealing in the third embodiment. On the other hand, the assist gas is not heated in the present embodiment. Instead, the corners of the battery are heated by semiconductor lasers 301 to 304 during laser sealing.

More specifically, four semiconductor lasers 301 to 304 are disposed so as to face the four corners 10d and to radiate the laser at the corners 10d. As a specific example of the semiconductor lasers 301 to 304, an AlGaAs laser diode or an InGaAsP laser diode is used.

The laser welding is performed as follows as in the case of the third embodiment. The laser 220 from the laser oscillator is converged on the boundary 40 between the cover plate and the external casing with the condenser lens. The laser 220 is radiated onto the boundary 40 to continuously mark a laser spot along the boundary 40. At the corners, the laser from the semiconductor lasers 301 to 304 is also radiated onto the boundary 40 so as to heat the molten part. By doing so, the molten part is gradually cooled.

When the external casing 10 of the rectangular battery is made by forming a metal plate into a bottomed rectangular cylinder, the residual stress is greater at the corners 10d, where the degree of unfractuosity is great, than in the straight-line parts 10e, where the unfractuosity degree is small, at the rim of the external casing 10. As a result, the corners 10d are susceptible to cracking. When the corners 10d are heated by the semiconductor lasers 301 to 304 during the laser sealing, however, the corners 10d are gradually cooled, so that the heat stress in the welded part at the corners 10d can be decreased and the cracking can be suppressed.

Meanwhile, the semiconductor lasers 301 to 304 can locally heat the corners 10d, so that no heat damage is inflicted on the generator element in the battery.

According to the present embodiment, the yield ratio can be improved as in the case of the first embodiment by gradually cooling the molten part by the heating with the semiconductor lasers 301 to 304 during the laser sealing.

While explanations of the embodiments of the present invention have been given taking the lithium secondary battery as the example, the present invention can be adopted for the primary cell and the secondary battery such as the nickel-metal hydride battery.

In addition, an aluminum alloy, which is susceptible to cracking, is used as the material of the external casing and the cover plate in the embodiments. The present invention, however, can be adopted for the case in which stainless is used.

Furthermore, explanations of the rectangular sealed battery, which is high in practically utility, have been given in the embodiments. The manufacturing method of the present invention, however, can be adopted for not only the rectangular sealed battery but also to the cell and battery using the bottomed external casing.

Note that while no explanation has been given about the energy distribution of the laser in the first, third, and fourth embodiment, the energy distribution of the laser is the Gaussian distribution.

In addition, it may be difficult to observe the welded part, which is made when the molten pool solidifies, as it is. In this case, however, the metal is molten at a high temperature and the crystal structure of the metal changes, so that the welded part can be observed with the electron microscope after a predetermined electropolishing process.

When separately adopted, the embodiments are highly effective in reducing the heat stress in the molten part. The embodiments, however, can be adopted in any combination and it is assumed that the embodiments have greater effects when adopted in combination than adopted separately.

INDUSTRIAL USE POSSIBILITY

The manufacturing method of sealed battery of the present invention is used for the manufacturing of the battery as the power source of a variety of electronic equipment including portable electric appliances such as the mobile phone, the audiovisual device, and the computer.

$$\rho c \frac{\delta T}{\delta T} = \frac{\delta}{\delta x}\left(K\frac{\delta T}{\delta x}\right) + \frac{\delta}{\delta y}\left(K\frac{\delta T}{\delta y}\right) + \frac{\delta}{\delta z}\left(K\frac{\delta T}{\delta z}\right) + Q \quad \text{Equation 1}$$

$$\begin{cases} \rho\text{:density} \\ c\text{:specific heat} \\ T\text{:temperature} \\ k\text{:heat conduction coefficient} \\ Q\text{:heat input amount} \end{cases}$$

$$\sigma = -E\sigma(t - t0) \quad \text{Equation 2}$$

$$\begin{cases} t\text{:temperature} \\ t0\text{:initial temperature} \\ E\text{:Young's modulus} \\ \sigma\text{:heat stress} \end{cases}$$

$$\begin{bmatrix} \frac{dB}{Pc} < 0.05 \\ \text{area occupied by the flat part provided} \geq 0.2W \end{bmatrix} \quad \text{Equation 6}$$

$$\begin{cases} W\text{:diameter of laser spot} \\ Pc\text{:energy at the center of laser spot} \\ dp\text{:finite difference between } Pc \text{ and energy at} \\ \quad \text{predetermined position of laser spot} \end{cases}$$

-continued $$I(x) = \exp\left(-\frac{2}{\omega^2} \times x^2\right) \text{ provided} \quad \text{Equation 7}$$

$$\begin{cases} \omega\text{:radius of laser spot} \\ x\text{:distance from center of laser spot} \end{cases}$$

TABLE 2

| beam shape | power (W) | heat stress (×10³ N/cm²) |
|---|---|---|
| conventional example | 60 | 5.5 |
| | 70 | 6.2 |
| | 80 | 6.9 |
| practical example | 60 | 3.3 |
| | 70 | 4.1 |
| | 80 | 4.6 |

What is claimed is:

1. A method of manufacturing a sealed battery, comprising:
    an external casing preparing step for preparing an external casing that is made of an aluminum alloy, the external casing with an opening and a rim around the opening, a thickness of the external casing at the rim being no greater than a thickness of the external casing at other parts of the external casing;
    a closure cap preparing step for preparing a closure cap that is made of the aluminum alloy, the closure cap fitting into the opening, the closure cap being a plate with a rib along an outer edge of the plate;
    a setting step for setting the closure cap to the external casing, after a generator element has been inserted into the external casing, so that the rib comes into contact with the rim;
    a welding step for welding the rim and the rib together by radiating an energy beam along a boundary between the rim and the rib, wherein
    the closure cap is prepared at the closure cap preparing step so as to satisfy equations $T2 \geq (T1/10+40)\,\mu m$ and $50(\mu m) \geq T3 \geq T1$, a thickness of the plate being set as $T1(\mu m)$, a height of the rib being set as $T2\,(\mu m)$, and a thickness of the rib being set as $T3(\mu m)$ and
    as a result, heat stress at a time of welding the aluminum alloy is reduced at the welding step.

2. The sealed battery manufacturing method according to claim 1, wherein the external casing is prepared at the external casing preparing step so as to satisfy an equation $50(\mu m) \geq L1 \geq L2$, the thickness of the external casing at the rim being set as L1 and the thickness of the external casing at the other parts being set as L2.

3. The sealed battery manufacturing method according to one of claims 1 and 2, wherein the rib is formed by bending outer regions of the plate at the closure cap preparing step.

4. The sealed battery manufacturing method according to claim 1, wherein the external casing is prepared at the external casing preparing step so that the thickness of the external casing at the rim is smaller than the thickness of the external casing at the other parts by applying pressure to a wall of the external casing at the rim from inside of the external casing.

5. The sealed battery manufacturing method according to claim 2, wherein the external casing is prepared at the external casing preparing step so that the thickness of the external casing at the rim is smaller than the thickness of the external casing at the other parts by applying pressure to a wall of the external casing at the rim from inside of the external casing.

6. The sealed battery manufacturing method according to claim 3, wherein the external casing is prepared at the external casing preparing step so that the thickness of the external casing at the rim is smaller than the thickness of the external casing at the other parts by applying pressure to a wall of the external casing at the rim from inside of the external casing.

* * * * *

UNITED STATES PATENT AND TRADEMARK OFFICE
CERTIFICATE OF CORRECTION

PATENT NO. : 6,843,811 B2  Page 1 of 1
APPLICATION NO. : 10/254967
DATED : January 18, 2005
INVENTOR(S) : Shinohara et al.

It is certified that error appears in the above-identified patent and that said Letters Patent is hereby corrected as shown below:

On Title Page Item (57) Col. 2
Abstract, line 6: "bas a rib, which is" should read --has a rib, which is--

Col. 8, line 14: "$50[\mu m] \geq T_3 \geq T_1$" should read --$50[\mu m] \leq T_3 \leq T_1$--

Col. 8, line 43: "$50[\mu m] \geq L_1 \geq L_2$" should read --$50[\mu m] \leq L_1 \leq L_2$--

Col. 9, line 9: "400 Um, and the thickness" should read --400 μm, and the thickness--

Col. 20, line 1, claim 1: "$50(\mu m) \geq T3 \geq T1$, a thickness" should read --$50(\mu m) \leq T3 \leq T1$, a thickness--

Col. 20, line 10, claim 2: "$50(\mu m) \geq L1 \geq L2$, the thickness" should read --$50(\mu m) \leq L1 \leq L2$, the thickness--

Col. 20, lines 13-14, claim 3: "according to one of claims 1 and 2," should read --according to claim 1,--

Signed and Sealed this

Seventeenth Day of October, 2006

JON W. DUDAS
*Director of the United States Patent and Trademark Office*